US012563458B2

(12) United States Patent
Esswie

(10) Patent No.: US 12,563,458 B2
(45) Date of Patent: Feb. 24, 2026

(54) BEAM HANDOVER FOR NETWORK ENERGY SAVING

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 18/360,552

(22) Filed: Jul. 27, 2023

(65) Prior Publication Data

US 2025/0039750 A1      Jan. 30, 2025

(51) Int. Cl.
| | |
|---|---|
| *H04W 36/00* | (2009.01) |
| *H04W 36/22* | (2009.01) |
| *H04W 36/30* | (2009.01) |
| *H04W 52/02* | (2009.01) |

(52) U.S. Cl.
CPC ....... *H04W 36/0072* (2013.01); *H04W 36/22* (2013.01); *H04W 36/302* (2023.05); *H04W 52/0206* (2013.01)

(58) Field of Classification Search
CPC ........... H04W 36/0072; H04W 36/302; H04W 36/22; H04W 52/0206
See application file for complete search history.

(56) References Cited

U.S. PATENT DOCUMENTS

2019/0081688 A1      3/2019  Deenoo et al.
2023/0389120 A1*   11/2023  Babaei .............. H04W 52/0235

2023/0397102 A1*   12/2023  Filin ................. H04W 52/0206
2024/0187954 A1      6/2024  Zhou et al.
2024/0276406 A1      8/2024  Babaei
2024/0292308 A1*    8/2024  Hwang ................ H04W 76/27
2024/0340753 A1*   10/2024  Jung ................... H04W 36/362

(Continued)

FOREIGN PATENT DOCUMENTS

WO         2023/122670         6/2023

OTHER PUBLICATIONS

Esswie, Ali. "Beam Handover for Network Energy Saving" U.S. Appl. No. 18/360,519, filed Jul. 27, 2023, 87 pages.

(Continued)

*Primary Examiner* — Margaret G Webb
(74) *Attorney, Agent, or Firm* — Amin, Turocy & Watson, LLP

(57)              ABSTRACT

A source radio access network node may determine to implement a network energy saving mode with respect to one or more user equipment being served by a beam. The node may configure the user equipment with a handover control channel resource usable by the user equipment to determine scheduling information usable by the user equipment to retrieve a handover information message. The handover information message may comprise a list of potential target nodes and a list of user equipment to be handed over to a target node. A user equipment may determine whether to monitor the handover control channel resource based on whether a handover criterion is satisfied. The user equipment may initiate handover to a target node if the user equipment is indicated in the handover information message or if the handover criterion is violated. The user equipment may transmit, to the source node, a handover success message.

20 Claims, 19 Drawing Sheets

(56) References Cited

U.S. PATENT DOCUMENTS

2025/0097799 A1* 3/2025 Fu ......................... H04W 48/08
2025/0168723 A1* 5/2025 Kim ................. H04W 36/0072

OTHER PUBLICATIONS

International Search Report and Written Opinion for PCT Application No. PCT/US2023/036303 mailed Apr. 26, 2024, 17 pages.
Feng Han et al: "Network energy saving techniques", 3GPP Draft; R3-226399; 3GPP RAN 3 #118, Toulouse, FR; Nov. 2022, 6 pages.
International Search Report and Written Opinion for PCT Application No. PCT/US2023/036306 mailed Apr. 26, 2024, 18 pages.
Notice of Allowance mailed Aug. 19, 2025 for U.S. Appl. No. 18/360,519, 54 pages.
Jain, Akshay, Elena Lopez-Aguilera, and Iiker Demirkol. "Evolutionary 4G/5G network architecture assisted efficient handover signaling." IEEE access 7 (2018): 256-283. (Year: 2018).

* cited by examiner

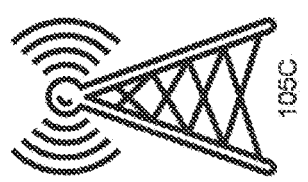
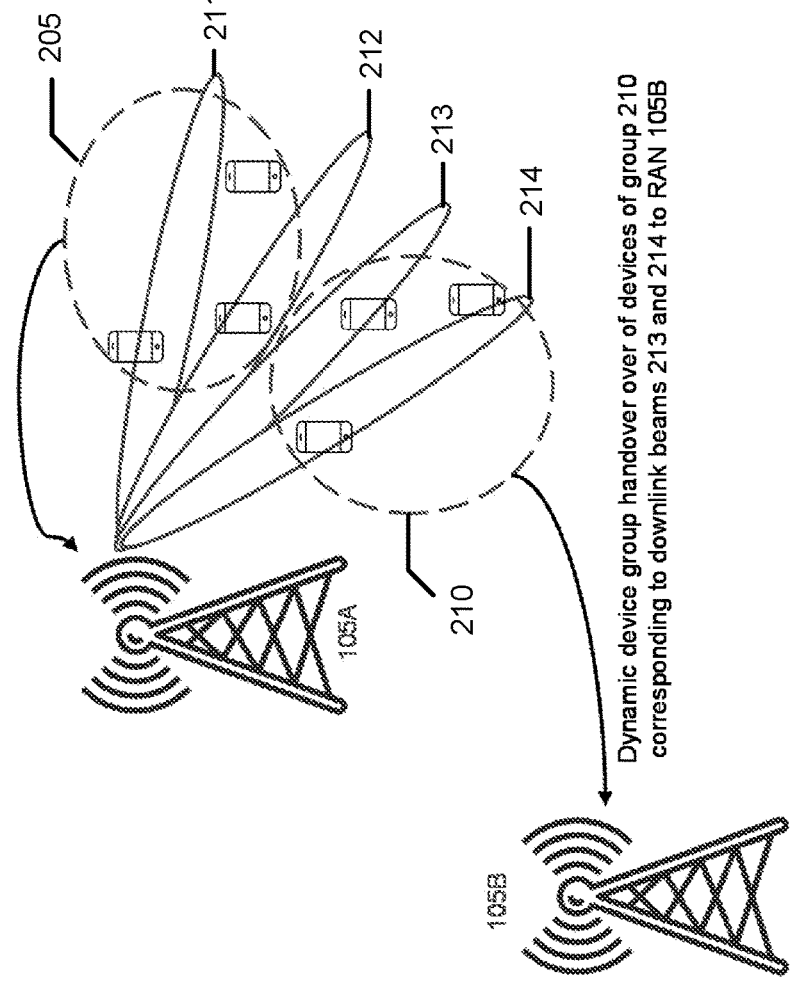
Devices of group 205, camped on downlink beams 211 and 212, stay connected to current RAN 105A
Dynamic device group handover over of devices of group 210 corresponding to downlink beams 213 and 214 to RAN 105B
FIG. 2
200

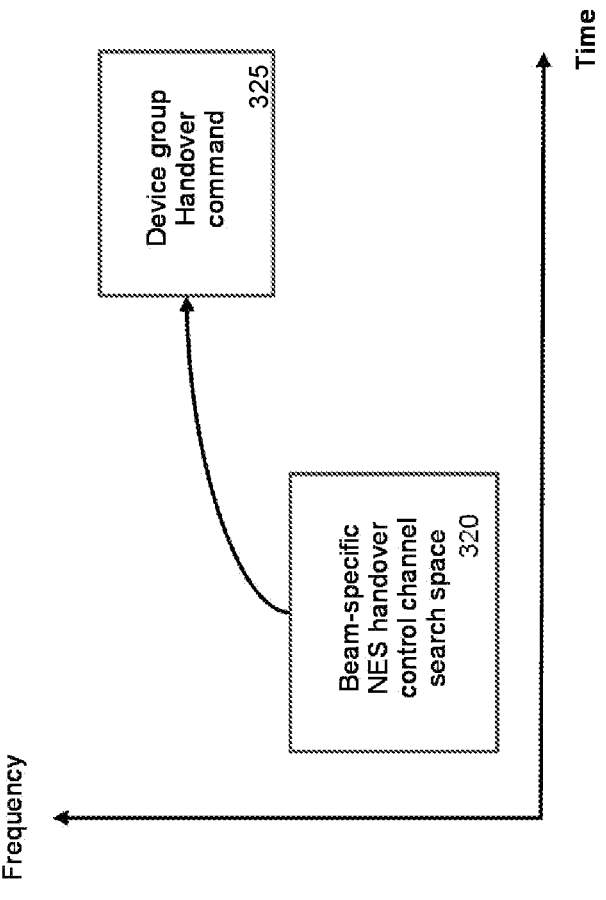
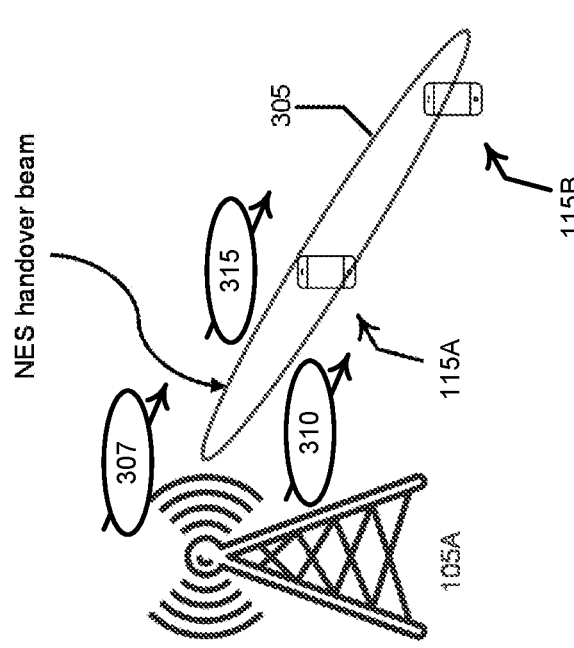
FIG. 3
300

Figure 4:
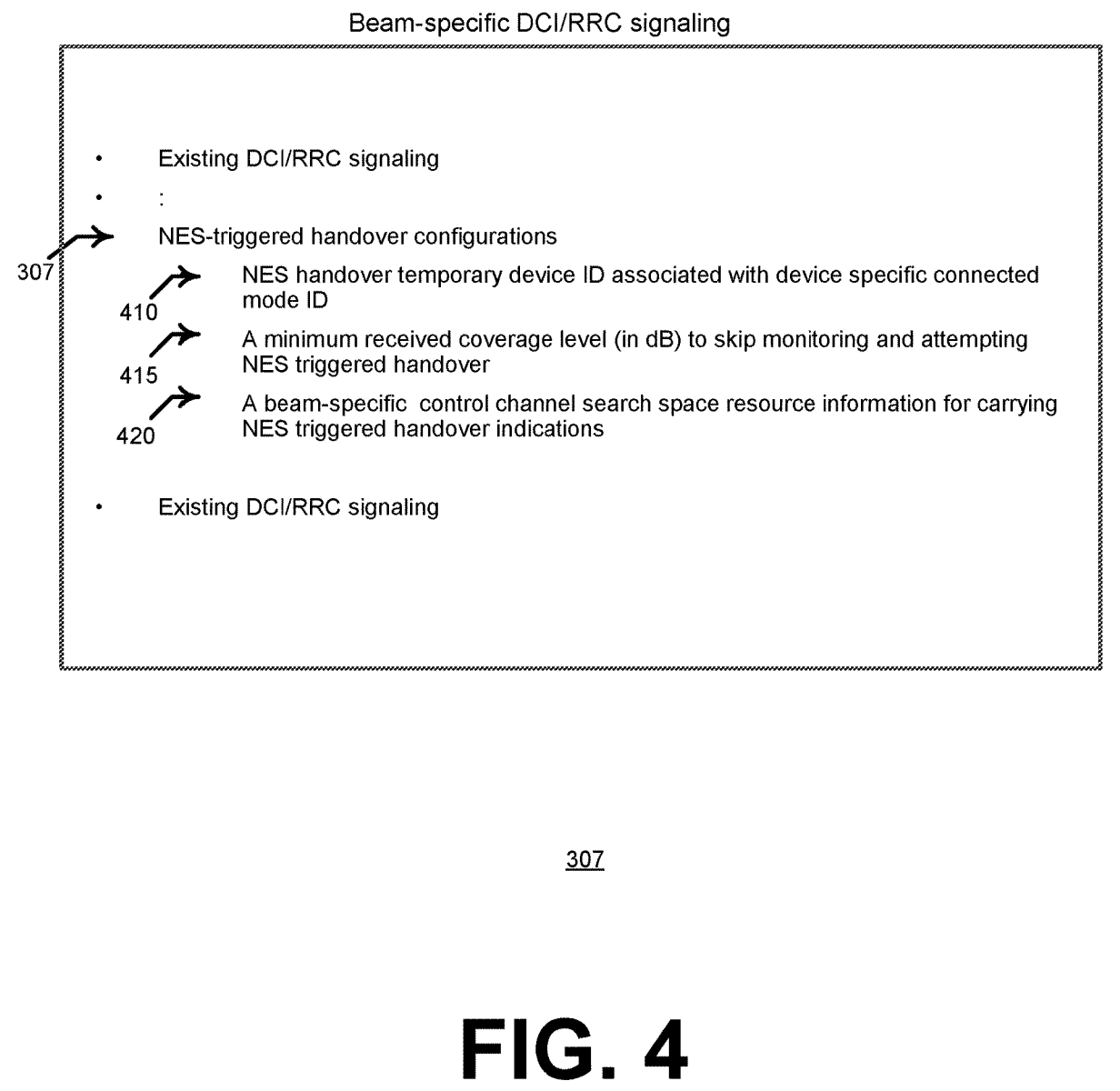

Beam-specific DCI/RRC signaling

- Existing DCI/RRC signaling

- .. NES-triggered handover configurations

410 → NES handover temporary device ID associated with device specific connected mode ID 415 → A minimum received coverage level (in dB) to skip monitoring and attempting NES triggered handover 420 → A beam-specific control channel search space resource information for carrying NES triggered handover indications

- Existing DCI/RRC signaling

307

307

FIG. 4 target RAN 105B

115A

115B

NES handover beam 604

105A

105B

Minimum receive signal strength/coverage level criterion to skip NES handover violated – UE 115B handed over to target RAN 105B

600

700

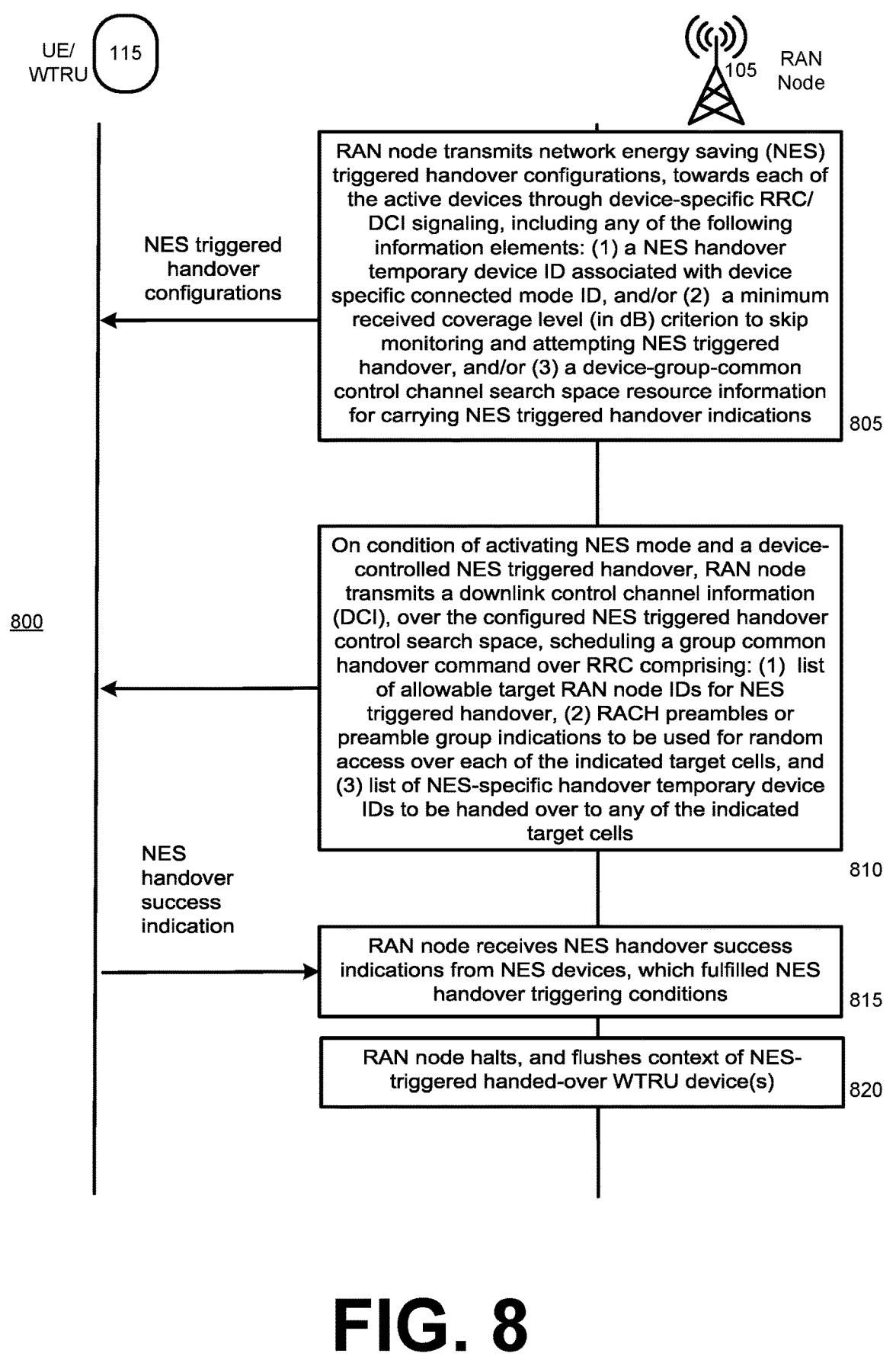

UE/
WTRU   115

((ᵒᵖ))
105   RAN
Node

NES triggered handover configurations

RAN node transmits network energy saving (NES) triggered handover configurations, towards each of the active devices through device-specific RRC/ DCI signaling, including any of the following information elements: (1) a NES handover temporary device ID associated with device specific connected mode ID, and/or (2) a minimum received coverage level (in dB) criterion to skip monitoring and attempting NES triggered handover, and/or (3) a device-group-common control channel search space resource information for carrying NES triggered handover indications   805

800

On condition of activating NES mode and a device-controlled NES triggered handover, RAN node transmits a downlink control channel information (DCI), over the configured NES triggered handover control search space, scheduling a group common handover command over RRC comprising: (1) list of allowable target RAN node IDs for NES triggered handover, (2) RACH preambles or preamble group indications to be used for random access over each of the indicated target cells, and (3) list of NES-specific handover temporary device IDs to be handed over to any of the indicated target cells

810

NES handover success indication

RAN node receives NES handover success indications from NES devices, which fulfilled NES handover triggering conditions   815

RAN node halts, and flushes context of NES-triggered handed-over WTRU device(s)   820

FIG. 8

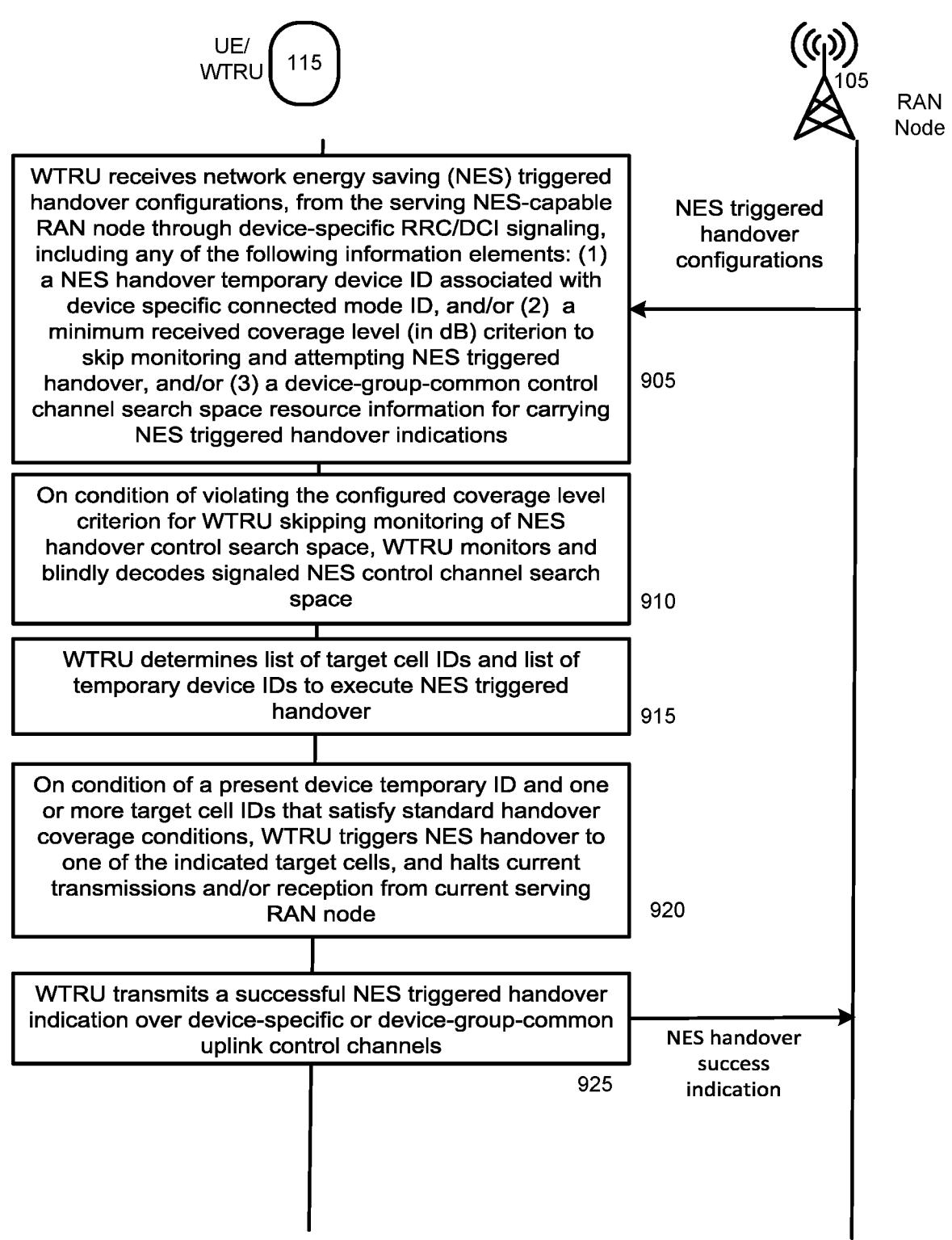

UE/
WTRU 115

((•)) 105
RAN
Node

WTRU receives network energy saving (NES) triggered handover configurations, from the serving NES-capable RAN node through device-specific RRC/DCI signaling, including any of the following information elements: (1) a NES handover temporary device ID associated with device specific connected mode ID, and/or (2) a minimum received coverage level (in dB) criterion to skip monitoring and attempting NES triggered handover, and/or (3) a device-group-common control channel search space resource information for carrying NES triggered handover indications    905

NES triggered handover configurations

On condition of violating the configured coverage level criterion for WTRU skipping monitoring of NES handover control search space, WTRU monitors and blindly decodes signaled NES control channel search space    910

WTRU determines list of target cell IDs and list of temporary device IDs to execute NES triggered handover    915

On condition of a present device temporary ID and one or more target cell IDs that satisfy standard handover coverage conditions, WTRU triggers NES handover to one of the indicated target cells, and halts current transmissions and/or reception from current serving RAN node    920

WTRU transmits a successful NES triggered handover indication over device-specific or device-group-common uplink control channels    925

NES handover success indication

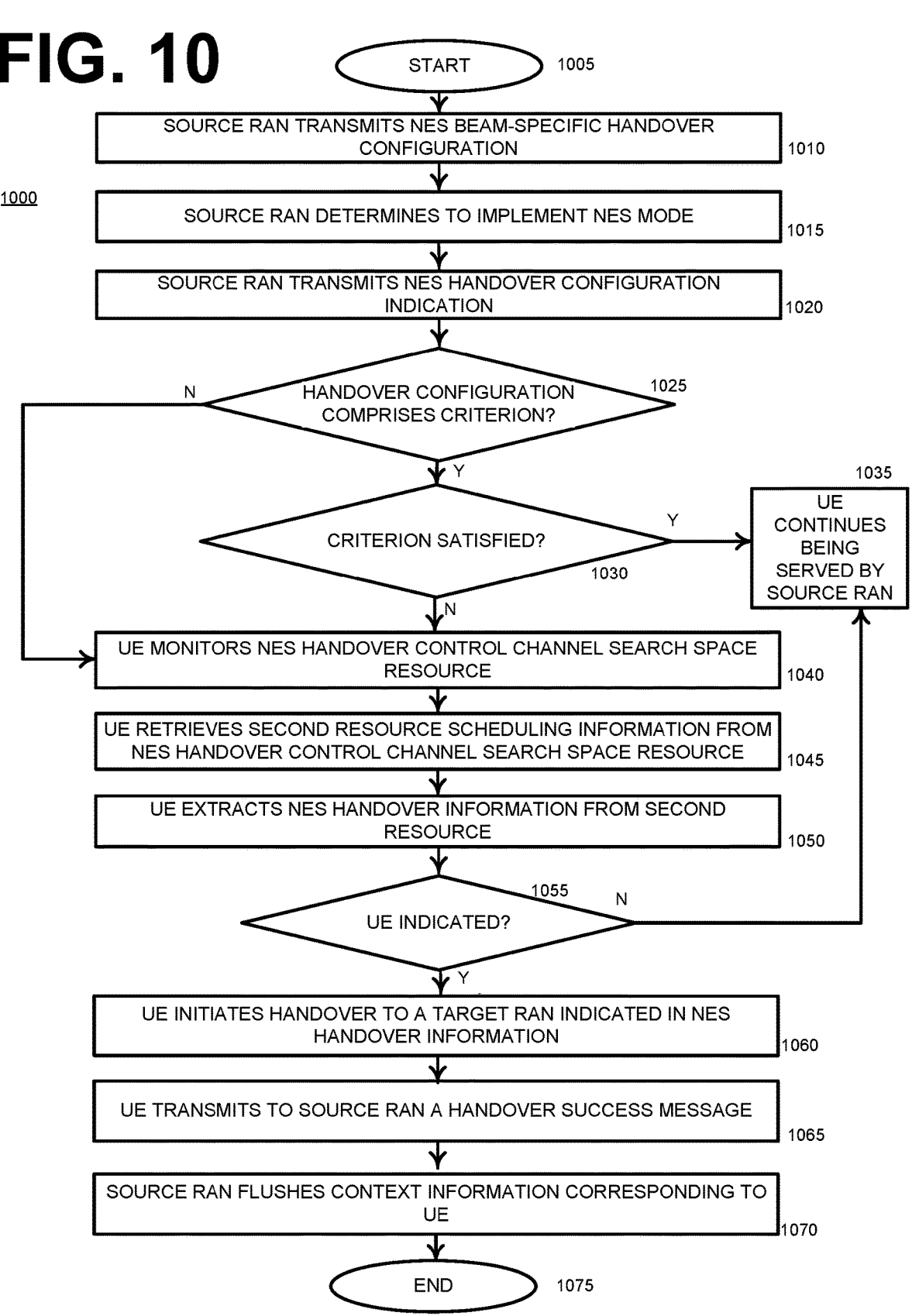

START 1005

SOURCE RAN TRANSMITS NES BEAM-SPECIFIC HANDOVER CONFIGURATION 1010

1000

SOURCE RAN DETERMINES TO IMPLEMENT NES MODE 1015

SOURCE RAN TRANSMITS NES HANDOVER CONFIGURATION INDICATION 1020

HANDOVER CONFIGURATION COMPRISES CRITERION? 1025 — N

CRITERION SATISFIED? 1030 — Y — UE CONTINUES BEING SERVED BY SOURCE RAN 1035

N

UE MONITORS NES HANDOVER CONTROL CHANNEL SEARCH SPACE RESOURCE 1040

UE RETRIEVES SECOND RESOURCE SCHEDULING INFORMATION FROM NES HANDOVER CONTROL CHANNEL SEARCH SPACE RESOURCE 1045

UE EXTRACTS NES HANDOVER INFORMATION FROM SECOND RESOURCE 1050

UE INDICATED? 1055 — N

Y

UE INITIATES HANDOVER TO A TARGET RAN INDICATED IN NES HANDOVER INFORMATION 1060

UE TRANSMITS TO SOURCE RAN A HANDOVER SUCCESS MESSAGE 1065

SOURCE RAN FLUSHES CONTEXT INFORMATION CORRESPONDING TO UE 1070

END 1075

Figure 11:
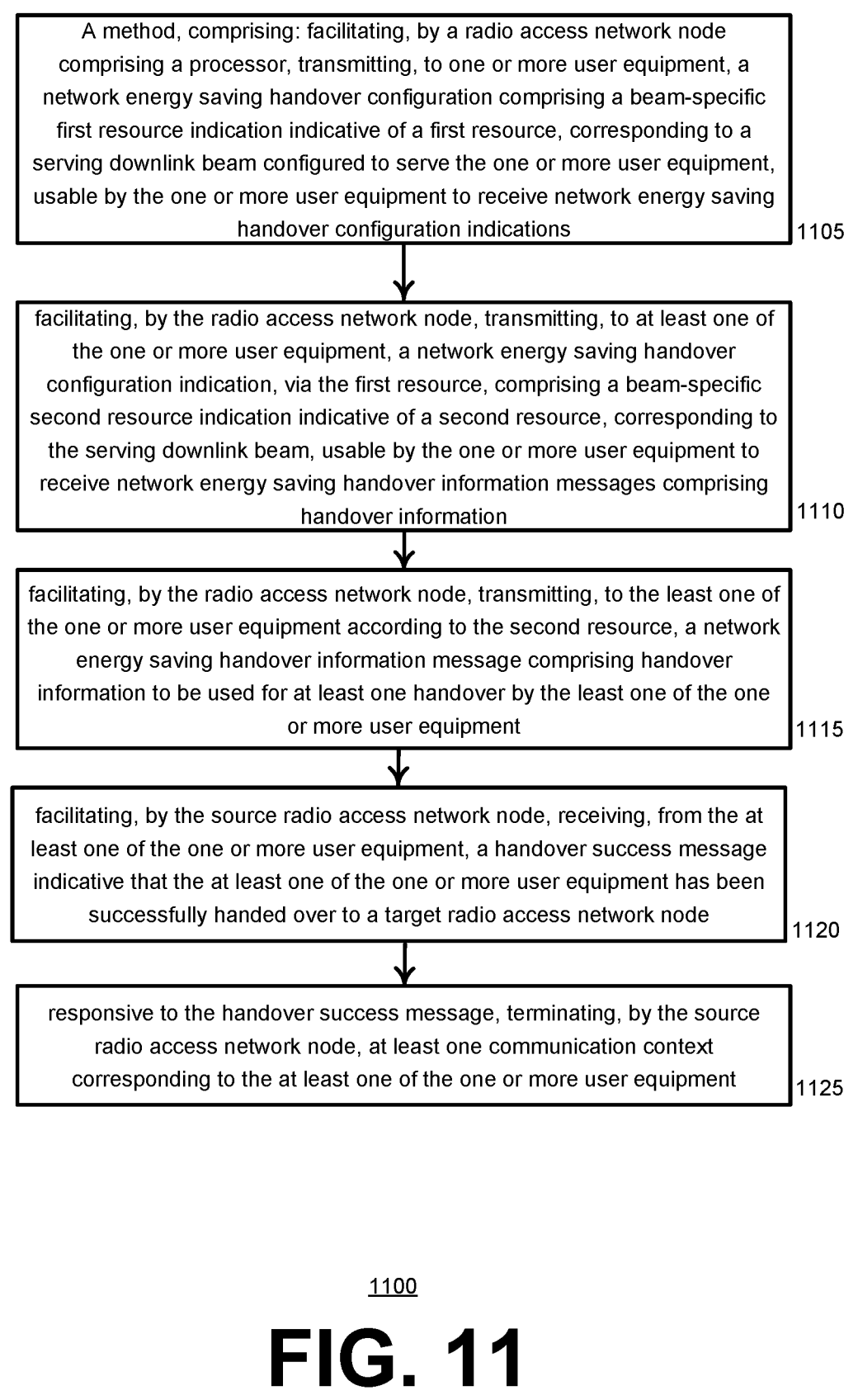

A method, comprising: facilitating, by a radio access network node comprising a processor, transmitting, to one or more user equipment, a network energy saving handover configuration comprising a beam-specific first resource indication indicative of a first resource, corresponding to a serving downlink beam configured to serve the one or more user equipment, usable by the one or more user equipment to receive network energy saving handover configuration indications    1105 facilitating, by the radio access network node, transmitting, to at least one of the one or more user equipment, a network energy saving handover configuration indication, via the first resource, comprising a beam-specific second resource indication indicative of a second resource, corresponding to the serving downlink beam, usable by the one or more user equipment to receive network energy saving handover information messages comprising handover information    1110 facilitating, by the radio access network node, transmitting, to the least one of the one or more user equipment according to the second resource, a network energy saving handover information message comprising handover information to be used for at least one handover by the least one of the one or more user equipment    1115 facilitating, by the source radio access network node, receiving, from the at least one of the one or more user equipment, a handover success message indicative that the at least one of the one or more user equipment has been successfully handed over to a target radio access network node    1120 responsive to the handover success message, terminating, by the source radio access network node, at least one communication context corresponding to the at least one of the one or more user equipment    1125

Figure 12:
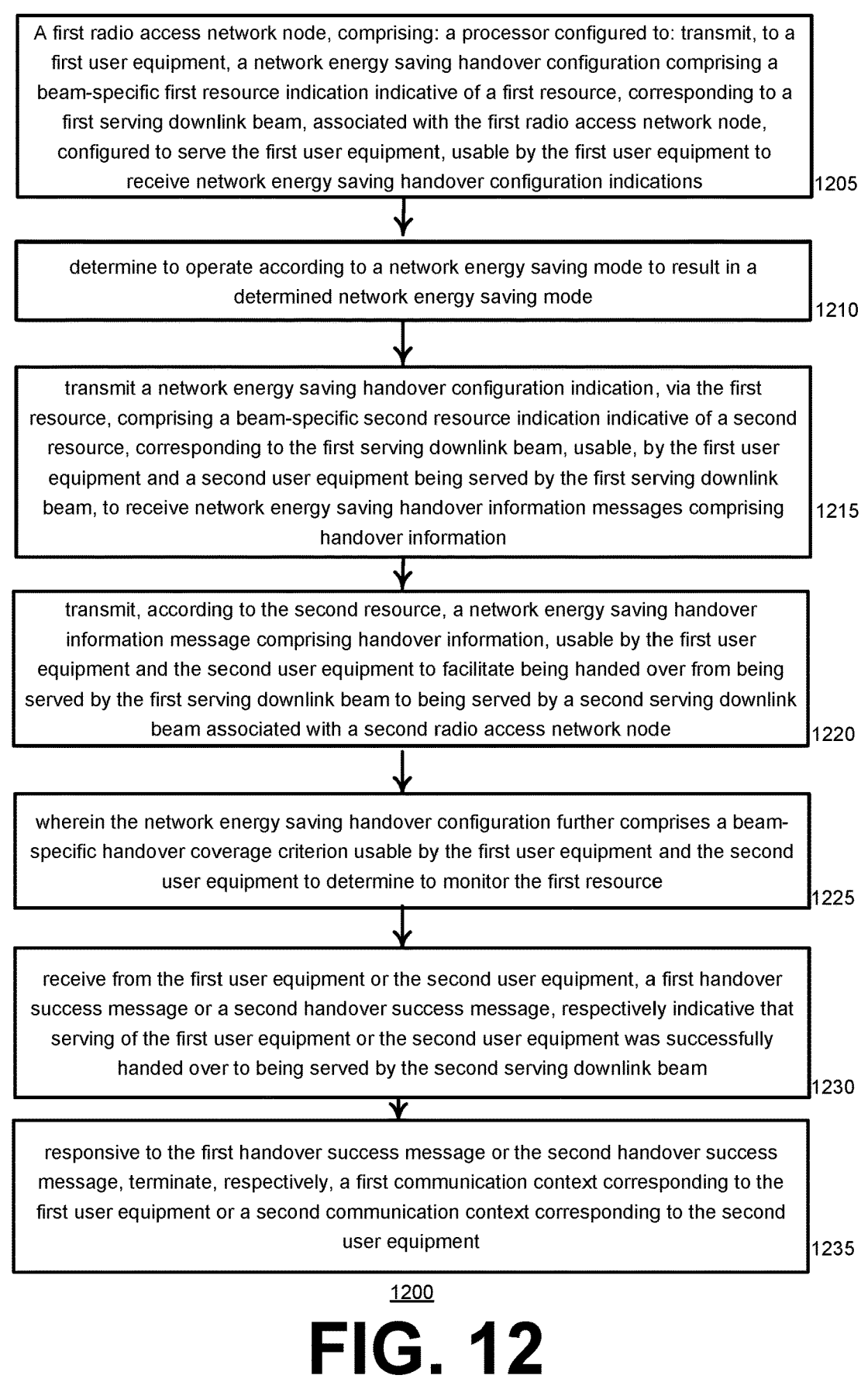

A first radio access network node, comprising: a processor configured to: transmit, to a first user equipment, a network energy saving handover configuration comprising a beam-specific first resource indication indicative of a first resource, corresponding to a first serving downlink beam, associated with the first radio access network node, configured to serve the first user equipment, usable by the first user equipment to receive network energy saving handover configuration indications — 1205

↓ determine to operate according to a network energy saving mode to result in a determined network energy saving mode — 1210

↓ transmit a network energy saving handover configuration indication, via the first resource, comprising a beam-specific second resource indication indicative of a second resource, corresponding to the first serving downlink beam, usable, by the first user equipment and a second user equipment being served by the first serving downlink beam, to receive network energy saving handover information messages comprising handover information — 1215

↓ transmit, according to the second resource, a network energy saving handover information message comprising handover information, usable by the first user equipment and the second user equipment to facilitate being handed over from being served by the first serving downlink beam to being served by a second serving downlink beam associated with a second radio access network node — 1220

↓ wherein the network energy saving handover configuration further comprises a beam-specific handover coverage criterion usable by the first user equipment and the second user equipment to determine to monitor the first resource — 1225

↓ receive from the first user equipment or the second user equipment, a first handover success message or a second handover success message, respectively indicative that serving of the first user equipment or the second user equipment was successfully handed over to being served by the second serving downlink beam — 1230

↓ responsive to the first handover success message or the second handover success message, terminate, respectively, a first communication context corresponding to the first user equipment or a second communication context corresponding to the second user equipment — 1235

Figure 13:
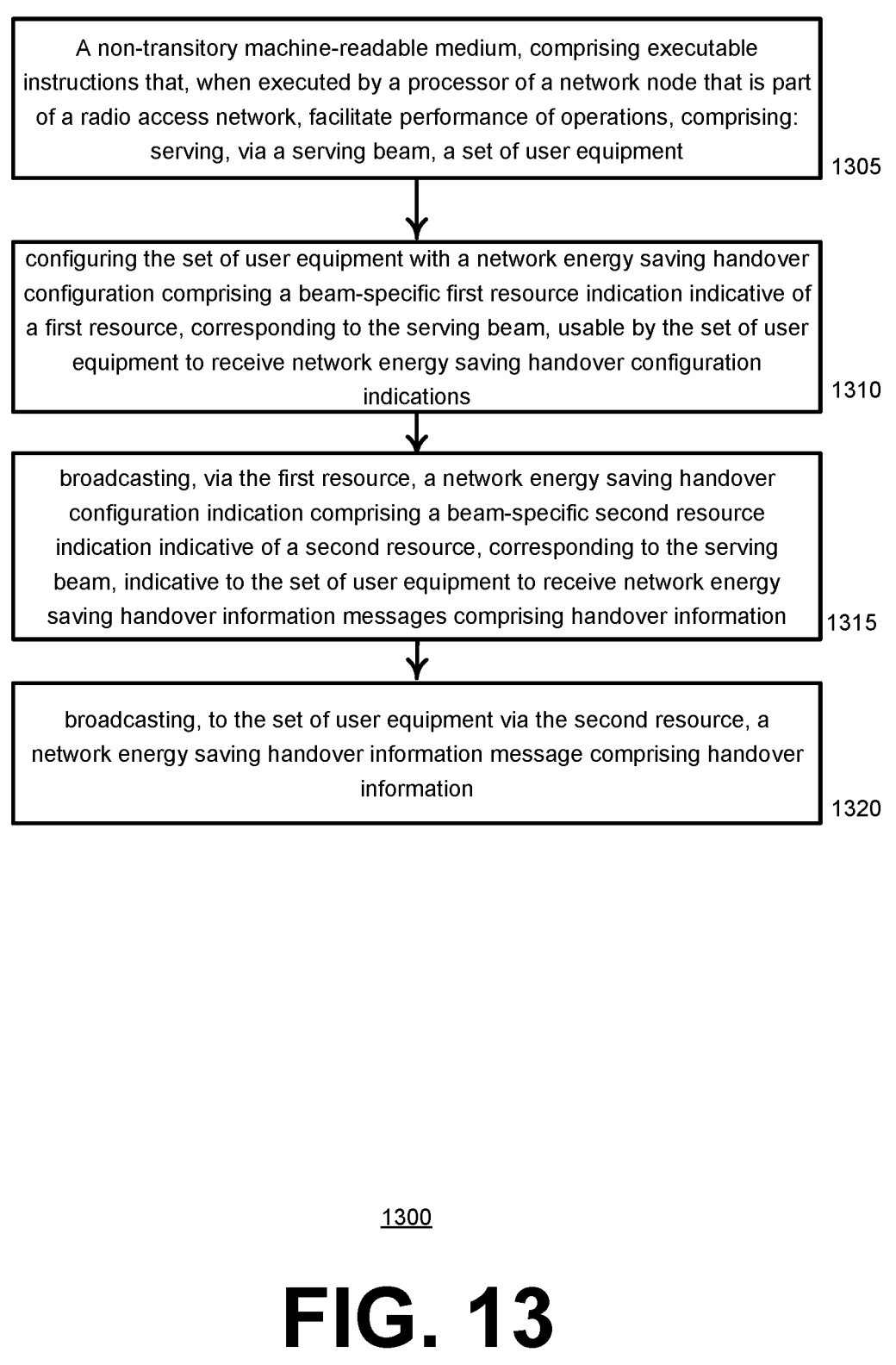

A non-transitory machine-readable medium, comprising executable instructions that, when executed by a processor of a network node that is part of a radio access network, facilitate performance of operations, comprising: serving, via a serving beam, a set of user equipment

1305 configuring the set of user equipment with a network energy saving handover configuration comprising a beam-specific first resource indication indicative of a first resource, corresponding to the serving beam, usable by the set of user equipment to receive network energy saving handover configuration indications

1310 broadcasting, via the first resource, a network energy saving handover configuration indication comprising a beam-specific second resource indication indicative of a second resource, corresponding to the serving beam, indicative to the set of user equipment to receive network energy saving handover information messages comprising handover information

1315 broadcasting, to the set of user equipment via the second resource, a network energy saving handover information message comprising handover information

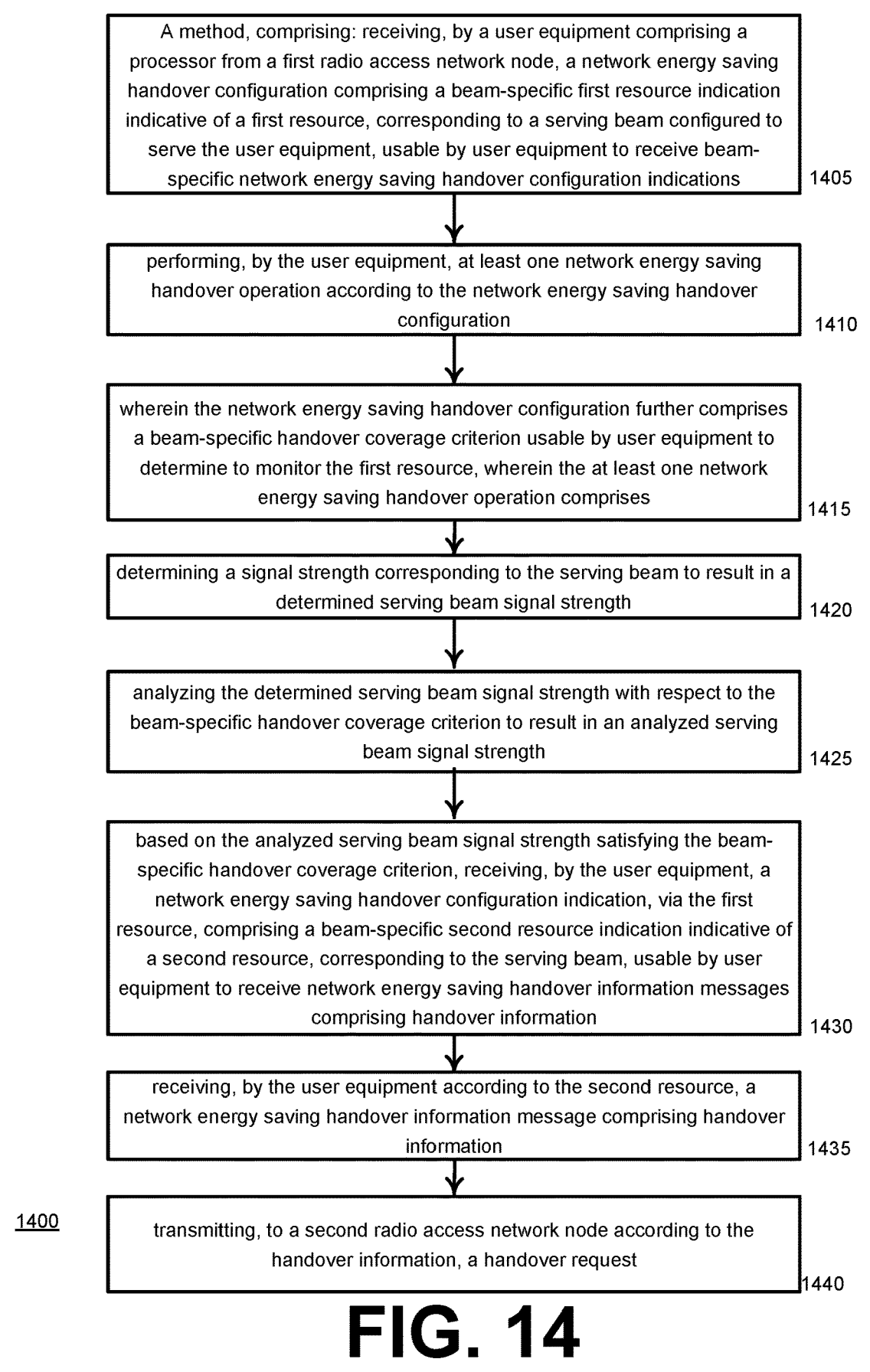

A method, comprising: receiving, by a user equipment comprising a processor from a first radio access network node, a network energy saving handover configuration comprising a beam-specific first resource indication indicative of a first resource, corresponding to a serving beam configured to serve the user equipment, usable by user equipment to receive beam-specific network energy saving handover configuration indications
1405

↓ performing, by the user equipment, at least one network energy saving handover operation according to the network energy saving handover configuration
1410

↓ wherein the network energy saving handover configuration further comprises a beam-specific handover coverage criterion usable by user equipment to determine to monitor the first resource, wherein the at least one network energy saving handover operation comprises
1415

↓ determining a signal strength corresponding to the serving beam to result in a determined serving beam signal strength
1420

↓ analyzing the determined serving beam signal strength with respect to the beam-specific handover coverage criterion to result in an analyzed serving beam signal strength
1425

↓ based on the analyzed serving beam signal strength satisfying the beam-specific handover coverage criterion, receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information
1430

↓ receiving, by the user equipment according to the second resource, a network energy saving handover information message comprising handover information
1435

↓

1400     transmitting, to a second radio access network node according to the handover information, a handover request
1440

FIG. 14

Figure 15:
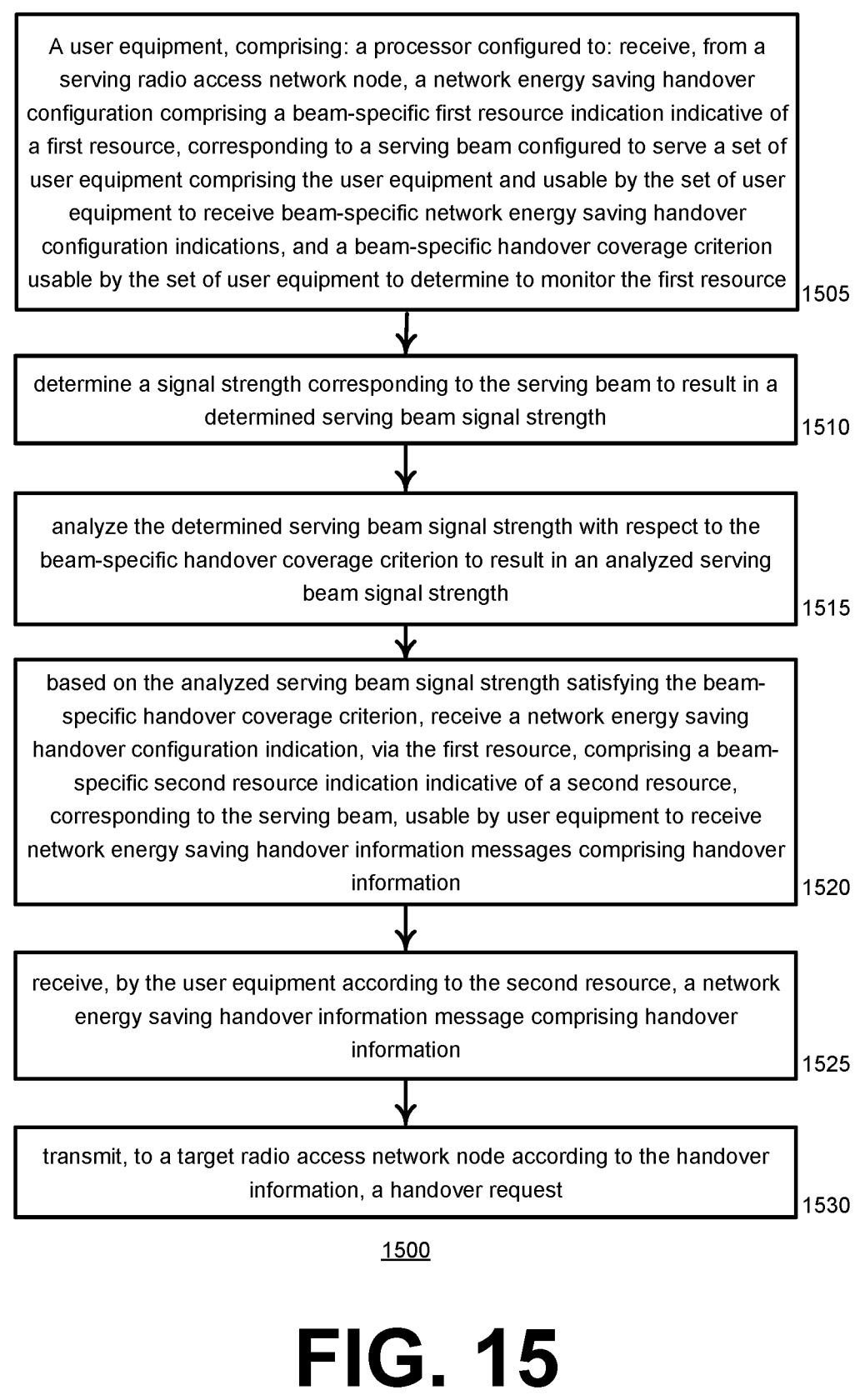

A user equipment, comprising: a processor configured to: receive, from a serving radio access network node, a network energy saving handover configuration comprising a beam-specific first resource indication indicative of a first resource, corresponding to a serving beam configured to serve a set of user equipment comprising the user equipment and usable by the set of user equipment to receive beam-specific network energy saving handover configuration indications, and a beam-specific handover coverage criterion usable by the set of user equipment to determine to monitor the first resource

1505 determine a signal strength corresponding to the serving beam to result in a determined serving beam signal strength

1510 analyze the determined serving beam signal strength with respect to the beam-specific handover coverage criterion to result in an analyzed serving beam signal strength

1515 based on the analyzed serving beam signal strength satisfying the beam-specific handover coverage criterion, receive a network energy saving handover configuration indication, via the first resource, comprising a beam-specific second resource indication indicative of a second resource, corresponding to the serving beam, usable by user equipment to receive network energy saving handover information messages comprising handover information

1520 receive, by the user equipment according to the second resource, a network energy saving handover information message comprising handover information

1525 transmit, to a target radio access network node according to the handover information, a handover request

Figure 16:
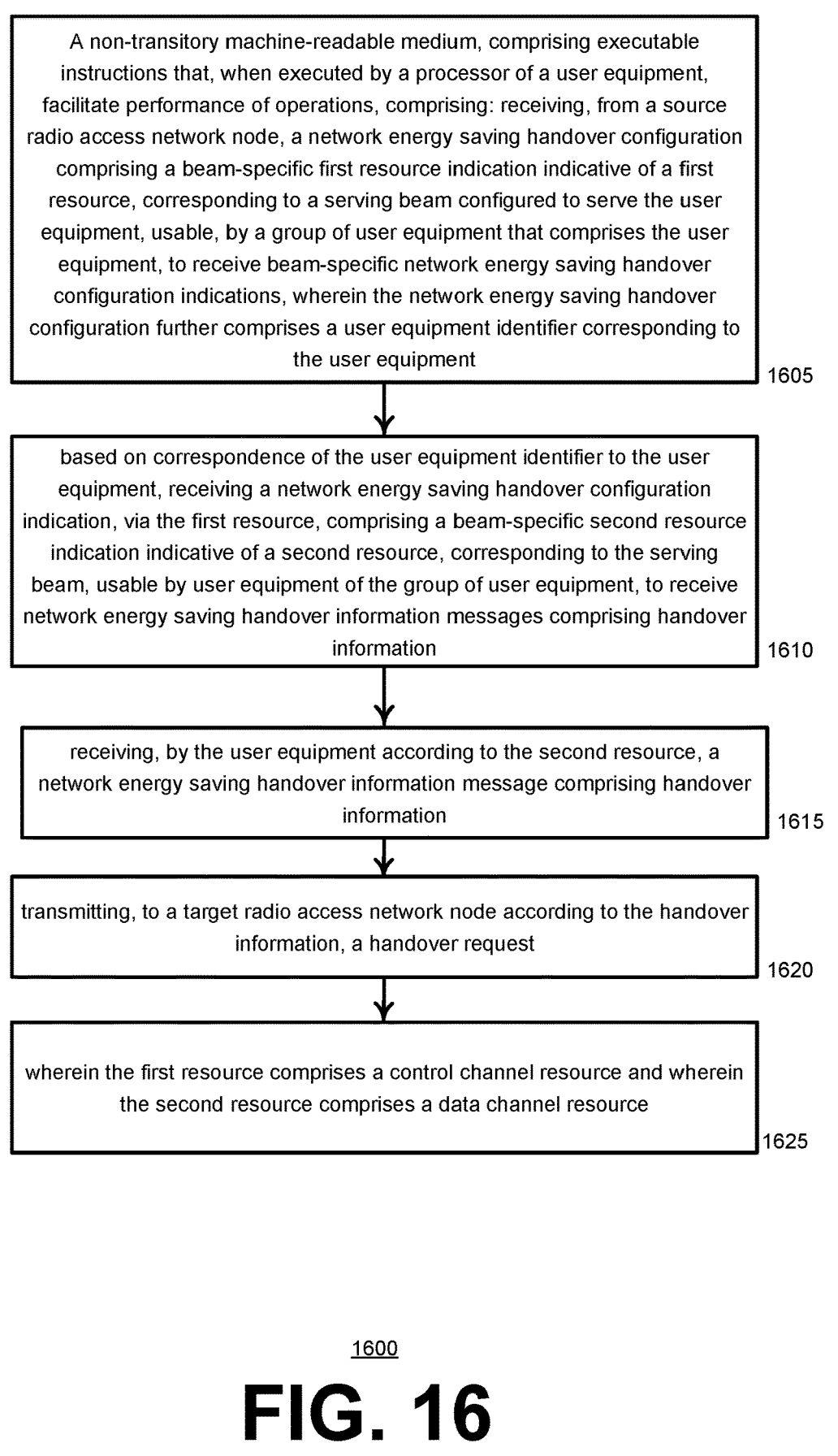

A non-transitory machine-readable medium, comprising executable instructions that, when executed by a processor of a user equipment, facilitate performance of operations, comprising: receiving, from a source radio access network node, a network energy saving handover configuration comprising a beam-specific first resource indication indicative of a first resource, corresponding to a serving beam configured to serve the user equipment, usable, by a group of user equipment that comprises the user equipment, to receive beam-specific network energy saving handover configuration indications, wherein the network energy saving handover configuration further comprises a user equipment identifier corresponding to the user equipment

1605 based on correspondence of the user equipment identifier to the user equipment, receiving a network energy saving handover configuration indication, via the first resource, comprising a beam-specific second resource indication indicative of a second resource, corresponding to the serving beam, usable by user equipment of the group of user equipment, to receive network energy saving handover information messages comprising handover information

1610 receiving, by the user equipment according to the second resource, a network energy saving handover information message comprising handover information

1615 transmitting, to a target radio access network node according to the handover information, a handover request

1620 wherein the first resource comprises a control channel resource and wherein the second resource comprises a data channel resource

BEAM HANDOVER FOR NETWORK ENERGY SAVING

CROSS REFERENCE TO RELATED APPLICATION

The subject patent application is related by subject matter to, U.S. patent application Ser. No. 18/360,519, filed Jul. 27, 2023, and entitled "Beam handover for network energy saving," the entirety of which priority application is hereby incorporated by reference herein.

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise facilitating, by a radio access network node comprising a processor, transmitting, to one or more user equipment, a network energy saving handover configuration comprising a beam-specific first resource indication indicative of a first resource, corresponding to a serving downlink beam configured to serve the one or more user equipment, usable by the one or more user equipment to receive network energy saving handover configuration indications. The method may further comprise facilitating, by the radio access network node, transmitting, to at least one of the one or more user equipment, a network energy saving handover configuration indication, via the first resource, comprising a beam-specific second resource indication indicative of a second resource, corresponding to the serving downlink beam, usable by the one or more user equipment to receive network energy saving handover information messages comprising handover information. The method may further comprise facilitating, by the radio access network node, transmitting, to the least one of the one or more user equipment according to the second resource, a network energy saving handover information message comprising handover information to be used for at least one handover by the least one of the one or more user equipment.

In an embodiment, the radio access network node may be a source radio access network node. The method may further comprise facilitating, by the source radio access network node, receiving, from the at least one of the one or more user equipment, a handover success message indicative that the at least one of the one or more user equipment has been successfully handed over to a target radio access network node. Responsive to the handover success message, the method may further comprise terminating, by the source radio access network node, at least one communication context corresponding to the at least one of the one or more user equipment.

In an embodiment, the radio access network node may be a source radio access network node. The method may further comprise facilitating, by the source radio access network node, receiving, from a target radio access network node to which the at least one of the one or more user equipment has been successfully handed over, a context request message comprising a request for context information corresponding to the at least one of the one or more user equipment. The method may further comprise responsive to the context request message, facilitating, by the source radio access network node, transmitting, to the target radio access network node, context information corresponding to the at least one of the one or more user equipment.

The first resource may be a control channel resource corresponding to the serving downlink beam. The second resource may be a data channel resource corresponding to the serving downlink beam.

In an embodiment, the network energy saving handover configuration may comprise a beam-specific handover coverage criterion usable by the one or more user equipment to determine to monitor the first resource. The beam-specific handover coverage criterion may be a signal strength criterion. The user equipment may determine to monitor the first resource if a signal strength corresponding to the serving downlink beam is lower than the specific handover coverage criterion.

In an embodiment, the network energy saving handover configuration may be a unique network energy saving handover configuration that is unique to one of the one or more user equipment and comprises a unique mask identifier associated with a unique permanent identifier corresponding to the one of the one or more user equipment. In an embodiment, the handover information may comprise at least one mask identifier corresponding to at least one of the one or more user equipment. In an embodiment, the handover information may comprise more than one mask identifier corresponding to more than one of the of the one or more user equipment.

In an embodiment, the radio access network node may be a source radio access network node. The handover information may comprise at least one target radio access network node identifier, corresponding to at least one target radio access network node, other than the source radio access network node, that may be available to establish a communication session with the at least one or the one or more user equipment.

In an embodiment, the handover information may comprise at least one preamble indication, indicative of at least one preamble, associated with at least one of the at least one target radio access network node identifier, usable by the at least one of the one or more user equipment to establish a communication session with the at least one of the at least one target radio access network node associated with the at least one preamble which may have been configured to facilitate handover of the user equipment upon receiving the preamble or a preamble from a preamble group.

In another example embodiment, a first radio access network node may comprise a processor configured to transmit, to a first user equipment, a network energy saving handover configuration comprising a beam-specific first resource indication indicative of a first resource, corresponding to a first serving downlink beam, associated with the first radio access network node, which first radio access network node may be configured to serve the first user equipment. The first resource may be usable by the first user equipment to receive network energy saving handover configuration indications. The processor may be further configured to determine to operate according to a network energy saving mode to result in a determined network energy saving mode. The processor may be further configured to transmit a network energy saving handover configuration indication, via the first resource, comprising a beam-specific second resource indication indicative of a second resource, corresponding to the first serving downlink beam, usable, by the first user equipment and a second user equipment being served by the first serving downlink beam, to receive network energy saving handover information messages comprising handover information. The processor may be further configured to transmit, according to the second resource, a network energy saving handover information message comprising handover information, usable by the first user equipment and the second user equipment to facilitate being handed over from being served by the first serving downlink beam to being served by a second serving downlink beam associated with a second radio access network node.

In an embodiment, the network energy saving handover configuration may further comprise a beam-specific handover coverage criterion usable by the first user equipment and the second user equipment to determine to monitor the first resource.

In an embodiment, the processor may be further configured to receive from the first user equipment or the second user equipment, a first handover success message or a second handover success message, respectively indicative that serving of the first user equipment or the second user equipment was successfully handed over to being served by the second serving downlink beam. Responsive to the first handover success message or the second handover success message, the processor may be further configured to terminate, respectively, a first communication context corresponding to the first user equipment or a second communication context corresponding to the second user equipment.

In an embodiment the processor may be further configured to receive, from the second radio access network node, a first context request comprising a request for first context information corresponding to the first user equipment or a second context request comprising a request for second context information corresponding to the second user equipment. Responsive to the first context request or the second context request, the processor may be further configured to transmit, respectively, to the second radio access network node, the first context information or the second context information.

In an embodiment, the processor may be further configured to avoid transmitting, to the second radio access network node, the first context information or the second context information before respectively receiving, from the second radio access network node, the first context request or the second context request.

In yet another example embodiment, a non-transitory machine-readable medium may comprise executable instructions that, when executed by a processor of a network node that is part of a radio access network, facilitate performance of operations, comprising serving, via a serving beam, a set of user equipment. The operations may further comprise configuring the set of user equipment with a network energy saving handover configuration comprising a beam-specific first resource indication indicative of a first resource, corresponding to the serving beam, usable by the set of user equipment to receive network energy saving handover configuration indications. The operations may further comprise broadcasting, via the first resource, a network energy saving handover configuration indication comprising a beam-specific second resource indication indicative of a second resource, corresponding to the serving beam, indicative to the set of user equipment to receive network energy saving handover information messages comprising handover information, and broadcasting, to the set of user equipment via the second resource, a network energy saving handover information message comprising handover information.

In an embodiment, the radio access network may be a first radio access network. The network energy saving handover information message may comprise at least one mask identifier, corresponding to at least one user equipment of the set of user equipment, indicative that only the at least one user equipment of the set of user equipment is specified to perform a handover operation with respect to a second radio access network.

In an embodiment, the network energy saving handover information message may exclude at least one mask identifier corresponding to at least one user equipment of the set of user equipment to result in an excluded user equipment, and wherein the excluded user equipment is excluded from being specified to perform a handover operation with respect to a second radio access network. The radio access network node made determined to exclude the excluded user equipment from being identified in the network energy saving handover information mode based on a type of traffic, or based on a quality of service corresponding to traffic, corresponding to the user equipment being served by the radio access network node.

In an embodiment, the radio access network may be a first radio access network. The network energy saving handover information message may comprise a radio access network identifier, corresponding to a second radio access network, indicative to at least one user equipment of the set of user equipment to perform a handover operation with respect to the second radio access network.

In another example embodiment, a method may comprise receiving, by a user equipment comprising a processor from a first radio access network node, a network energy saving handover configuration comprising a beam-specific first resource indication indicative of a first resource, corresponding to a serving beam configured to serve the user equipment, usable by user equipment to receive beam-specific network energy saving handover configuration indications, and performing at least one network energy saving handover operation according to the network energy saving handover configuration.

In an embodiment, the network energy saving handover configuration may further comprise a beam-specific handover coverage criterion usable by user equipment to determine to monitor the first resource. The at least one network energy saving handover operation may comprises determining a signal strength corresponding to the serving beam to result in a determined serving beam signal strength, and analyzing the determined serving beam signal strength with respect to the beam-specific handover coverage criterion to result in an analyzed serving beam signal strength. Based on the analyzed serving beam signal strength satisfying the beam-specific handover coverage criterion, the at least one network energy saving handover operation may further comprise receiving a network energy saving handover configuration indication, via the first resource, comprising a beam-specific second resource indication indicative of a second resource, corresponding to the serving beam, usable by user equipment to receive network energy saving handover information messages comprising handover information. The at least one network energy saving handover operation may further comprise receiving, by the user equipment according to the second resource, a network energy saving handover information message comprising handover information, and transmitting, to a second radio access network node according to the handover information, a handover request.

The method may further comprise transmitting, by the user equipment to the first radio access network node, a handover success message indicative to the first radio access network node that the user equipment has successfully been handed over the second radio access network node.

In an embodiment, the network energy saving handover configuration may further comprise a beam-specific handover coverage criterion usable by the user equipment to determine to monitor the first resource. The comprise determining a signal strength corresponding to the serving beam to result in a determined serving beam signal strength, and analyzing the determined serving beam signal strength with respect to the beam-specific handover coverage criterion to result in an analyzed serving beam signal strength. Based on the analyzed serving beam signal strength failing to satisfy the beam-specific handover coverage criterion, the at least one network energy saving handover operation may comprise avoiding, by the user equipment, monitoring the first resource, and continuing communication of traffic with the first radio access network node via the serving beam.

In an embodiment, the network energy saving handover configuration may further comprise a user equipment identifier corresponding to the user equipment. The method may further comprise, based on correspondence of the user equipment identifier to the user equipment, receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information. The method may further comprise receiving, by the user equipment according to the second resource, a network energy saving handover information message comprising handover information, and transmitting, to a second radio access network node according to the handover information, a handover request.

In an embodiment, the user equipment identifier may comprise a mask identifier, wherein the network energy saving handover configuration is specifically corresponds only to the user equipment, and wherein the network energy saving handover configuration further comprises the mask identifier being associated with a unique identifier corresponding to the user equipment. The unique identifier corresponding to the user equipment may be an international mobile subscriber identity. The handover information may comprise a radio access network node identifier corresponding to the second radio access network node.

In an embodiment, the at least one network energy saving handover operation may comprises receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information. The at least one network energy saving handover operation may further comprise receiving, by the user equipment according to the second resource, a network energy saving handover information message comprising handover information, wherein the handover information comprises a first radio access network node identifier corresponding to a second radio access network node and a second radio access network node identifier corresponding to a third radio access network node. The at least one network energy saving handover operation may further comprise determining, by the user equipment, a first signal strength with respect to the second radio access network node and a second signal strength with respect to the third radio access network node. Based on the first signal strength and the second signal strength, the at least one network energy saving handover operation may further comprise determining, by the user equipment, a strongest signal strength, determining, by the user equipment, the second radio access network node or the third radio access network node corresponding to the strongest signal strength to result in a determined strongest radio access network node, and transmitting, by the user equipment to the determined strongest radio access network node, a handover request.

The handover information may comprise a first preamble associated with the first radio access network node identifier and a second preamble associated with the second radio access network node identifier. The handover request may comprise the first preamble or the second preamble associated in the handover information message with the determined strongest radio access network node. The handover information may comprise a first preamble group of preambles associated with the first radio access network node identifier and a second preamble group of preambles associated with the second radio access network node identifier. The handover request may comprise a preamble selected by the user equipment from the first preamble group or the handover request may comprise a preamble selected by the user equipment from the second preamble group associated in the handover information message with the determined strongest radio access network node.

In another example embodiment, a user equipment may comprise a processor configured to receive, from a serving radio access network node, a network energy saving handover configuration. The network energy saving handover configuration may comprise a beam-specific first resource indication indicative of a first resource, corresponding to a serving beam configured to serve a set of user equipment comprising the user equipment and usable by the set of user equipment to receive beam-specific network energy saving handover configuration indications. The network energy saving handover configuration may comprise a beam-specific handover coverage criterion usable by the set of user equipment to determine to monitor the first resource.

The processor may be further configured to determine a signal strength corresponding to the serving beam to result in a determined serving beam signal strength and to analyze the determined serving beam signal strength with respect to the beam-specific handover coverage criterion to result in an analyzed serving beam signal strength. Based on the analyzed serving beam signal strength satisfying the beam-specific handover coverage criterion, The processor may be further configured to receive a network energy saving handover configuration indication, via the first resource, comprising a beam-specific second resource indication indicative of a second resource, corresponding to the serving beam, usable by user equipment to receive network energy saving handover information messages comprising handover information. The processor may be further configured to receive, according to the second resource, a network energy saving handover information message comprising handover information, and to transmit, to a target radio access network node according to the handover information, a handover request.

In an embodiment, the processor may be further configured to transmit, to the serving radio access network node, a handover success message indicative to the serving radio access network node that the user equipment has successfully been handed over the target radio access network node. The handover information may comprise target radio access network node identifying information corresponding to the target radio access network node.

In an embodiment, the user equipment may be a first user equipment. The set of user equipment may further comprise a second user equipment. The handover information may comprise a first user equipment identifier corresponding to the first user equipment and a second user equipment identifier corresponding to the second user equipment. The first user equipment identifier and the second user equipment identifier may be respectively indicative to the first user equipment and the second user equipment that the first user equipment and the second user equipment are specified to be handed over to the target radio access network node. The handover request may be a first handover request with respect to the first user equipment and the handover request may be a second handover request with respect to the second user equipment. The first user equipment may transmit the first handover request to the target radio access network node and the second user equipment may transmit the second handover request to the target radio access network node.

In an embodiment, the first resource indicated in the network energy saving handover configuration may be usable by multiple user equipment to receive beam-specific network energy saving handover configuration indications.

In yet another embodiment, a non-transitory machine-readable medium may comprise executable instructions that, when executed by a processor of a user equipment, facilitate performance of operations, comprising receiving, from a source radio access network node, a network energy saving handover configuration comprising a beam-specific first resource indication indicative of a first resource, corresponding to a serving beam configured to serve the user equipment, usable, by a group of user equipment that comprises the user equipment, to receive beam-specific network energy saving handover configuration indications. The network energy saving handover configuration may further comprise a user equipment identifier corresponding to the user equipment. Based on correspondence of the user equipment identifier to the user equipment, the operations may further comprise receiving, by the user equipment, a network energy saving handover configuration indication, via the first resource, comprising a beam-specific second resource indication indicative of a second resource, corresponding to the serving beam, usable by user equipment of the group of user equipment, to receive network energy saving handover information messages comprising handover information. The operations may further comprise receiving, by the user equipment according to the second resource, a network energy saving handover information message comprising handover information, and transmitting, to a target radio access network node according to the handover information, a handover request.

In an embodiment, the handover information may comprise a first radio access network node identifier corresponding to a first potential target radio access network node and a second radio access network node corresponding to a second potential target radio access network node, the operations further comprising. The operations may further comprise determining a first signal strength with respect to the first potential target radio access network node and a second signal strength with respect to the second potential target radio access network node. Based on the first signal strength and the second signal strength, The operations may further comprise determining a strongest signal strength, and determining the first potential target radio access network node or the second potential target radio access network node As being a potential target radio access node corresponding to the strongest signal strength to result in the target radio access network node.

In an embodiment, the network energy saving handover configuration may comprise a first preamble corresponding to the first potential target radio access network node and a second preamble corresponding to the second potential target radio access network node. The handover request may comprise the first preamble or the second preamble corresponding to the target radio access network node.

In an embodiment, the first resource may comprise a control channel resource and the second resource may comprise a data channel resource.

In an embodiment, the user equipment identifier may be a mask identifier associated, in the network energy saving handover configuration, with an international mobile subscriber identity. The handover request may comprise the international mobile subscriber identity.

BRIEF DESCRIPTION OF THE DRAWINGS

FIG. 2 illustrates an example environment with user equipment corresponding to a beam being handed over.

FIG. 2 illustrates an example environment with user equipment corresponding to a beam being handed over.

FIG. 3 illustrates a handover beam search space to hand over user equipment corresponding to a beam.

FIG. 4 illustrates an example network energy saving handover configuration.

FIG. 8 illustrates a timing diagram of an example method to facilitate handover of a user equipment to achieve network energy saving.

FIG. 9 illustrates a timing diagram of an example method of a user equipment being handed over to a target radio access network node to achieve network energy saving.

FIG. 10 illustrates a flow diagram of an example method to handover a user equipment to achieve network energy saving.

FIG. 11 illustrates a block diagram of an example method.

FIG. 12 illustrates a block diagram of an example first radio access network node.

FIG. 13 illustrates a block diagram of an example non-transitory machine-readable medium.

FIG. 14 illustrates a block diagram of an example method.

FIG. 15 illustrates a block diagram of an example user equipment.

FIG. 16 illustrates a block diagram of an example non-transitory machine-readable medium.

DETAILED DESCRIPTION OF THE DRAWINGS

Figure 1:
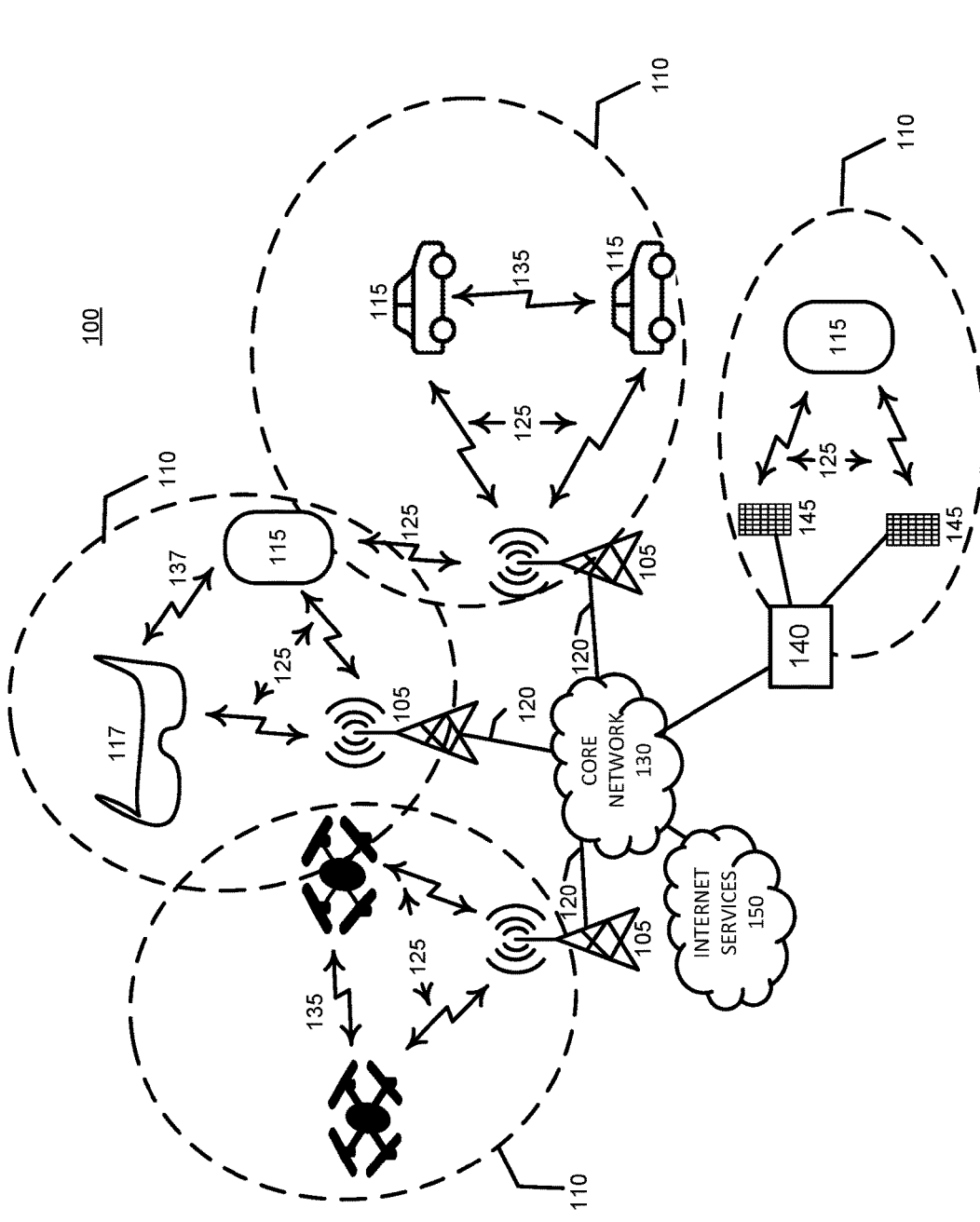
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN node, or a component thereof, may be implemented by one or more computer components, or by software executed thereby, that may be described in reference to FIG. 17.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a nonstandalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system

100. For example, the carrier bandwidth may be one of a number of determined bandwidths for carriers of a particular radio access technology (e.g., 1.4, 3, 5, 10, 15, 20, 40, or 80 megahertz (MHZ)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations

105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHZ.

The wireless communication system 100 may also operate in a super high frequency (SHF) region using frequency bands from 3 GHZ to 30 GHZ, also known as the centimeter band, or in an extremely high frequency (EHF) region of the spectrum (e.g., from 30 GHz to 300 GHZ), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Network Energy Saving

Energy or power saving is desirable in cellular networks, for both network equipment and user equipment. An objective of Network Energy Saving ("NES") mode is to facilitate a RAN node, that may be experiencing high power consumption, limited battery capacity, or power source disruptions, dynamically relax support of one or more radio functions, or one or more radio services, that the RAN node may otherwise support, until an improvement in power situation is achieved, for example, an off-site power source of the RAN node being restored such that the RAN no longer relies on power from a battery on-site at the RAN, or until capacity of an on-site battery is restored to a configured level. Implementing NES may facilitate cost efficiency or power efficiency at the RAN node, (e.g., activating NES mode during a light load time for a RAN that experiences a high variance rate of traffic loads throughout a given day), or may facilitate service continuity, especially for emergency services/calls, in case of power source disruptions/outage. Accordingly, a cell's RAN node may dynamically implement NES mode to temporarily halt support of, or offering of, high-energy-consumption radio services for a determined or configured period. Non-limiting examples of power-heavy radio services, or operations, include ultra-fast scheduling associated with mini-slot scheduling for latency-critical services, data duplication for enhanced radio reliability, and others.

5G Handover

'Handover' may refer to transferring an ongoing call or data session from one base station to another. This is an important function, especially in cellular networks where users are often on the move and require a seamless transition between cell sites without losing connectivity.

The introduction of 5G technology has significantly improved the handover process, making it faster and more efficient than ever before. With 5G networking techniques, handovers can occur between different types of cells, including small cells, macrocells, and millimeter-wave cells, depending on the network coverage and capacity requirements. 5G handover may be perceived as seamless and ultrafast, even with respect to highly dynamic network conditions. Handover according to 5G techniques may be achieved through the use of beamforming, massive MIMO, and network slicing, which enable a radio access network to allocate resources more efficiently and adapt to changing network conditions in real-time. Moreover, 5G networks also support dual connectivity, which facilitates user equipment being connected to multiple base stations simultaneously, thereby improving data speeds and reducing latency. For example, a user equipment device can maintain its connection to an original base station while simultaneously connecting to a secondary base station, which can provide additional resources and capacity.

NES Handover

Using conventional techniques, a RAN node/cell may activate operation according to an NES mode and may offload a group of active user equipment devices towards adjacent RAN nodes according to the NES mode. That is, the NES RAN node may trigger a handover procedure with respect to each of multiple active user equipment devices that have been determined to be handed over to being served by another RAN node to facilitate NES gains by the current serving RAN node. However, using conventional techniques may lead to severe degradation or drop of an overall RAN node capacity (e.g., spectral efficiency) during periods when multi-device handover procedures are initiated. This is due to handover signaling required for each active device to-be-handed-over towards adjacent cells. For instance, in a scenario with 50% of active device connections determined to be offloaded due to NES, and for a macro deployment of 128 downlink beams, with each beam each serving 10 devices on average (e.g., total device connections are 1280), the NES-activating RAN node simultaneously triggers a separate signaling-heavy handover procedure with respect to each of at least 640 devices, transmitting many multiple device-specific handover commands, leading to a resource starvation and channel congestion until all those handover commands are fully transmitted and devices are actually handed over.

According to embodiments disclosed herein, beam-specific handover techniques facilitate handover signaling overhead being proportional to a number of downlink beams instead of signaling overhead being proportional to a number of active devices to be handed over, as is the case with conventional device-specific handover techniques.

Conventional handover techniques are device-specific in nature with handover control commands being exchanged separately between a RAN node and each of to-be-handed over user equipment devices. Embodiments disclosed herein are beam-specific in nature, wherein a single handover control message may enable seamless handovers for multiple user equipment devices that are being served by the same downlink beam via which the handover control message is transmitted. Thus, a handover command and respective transmission overhead corresponds to a downlink beam instead of corresponding to a number of active user equipment being served by, and being handed over from, the beam.

Beam Handover Offload for Network Energy Saving (NES)

Figure 19:
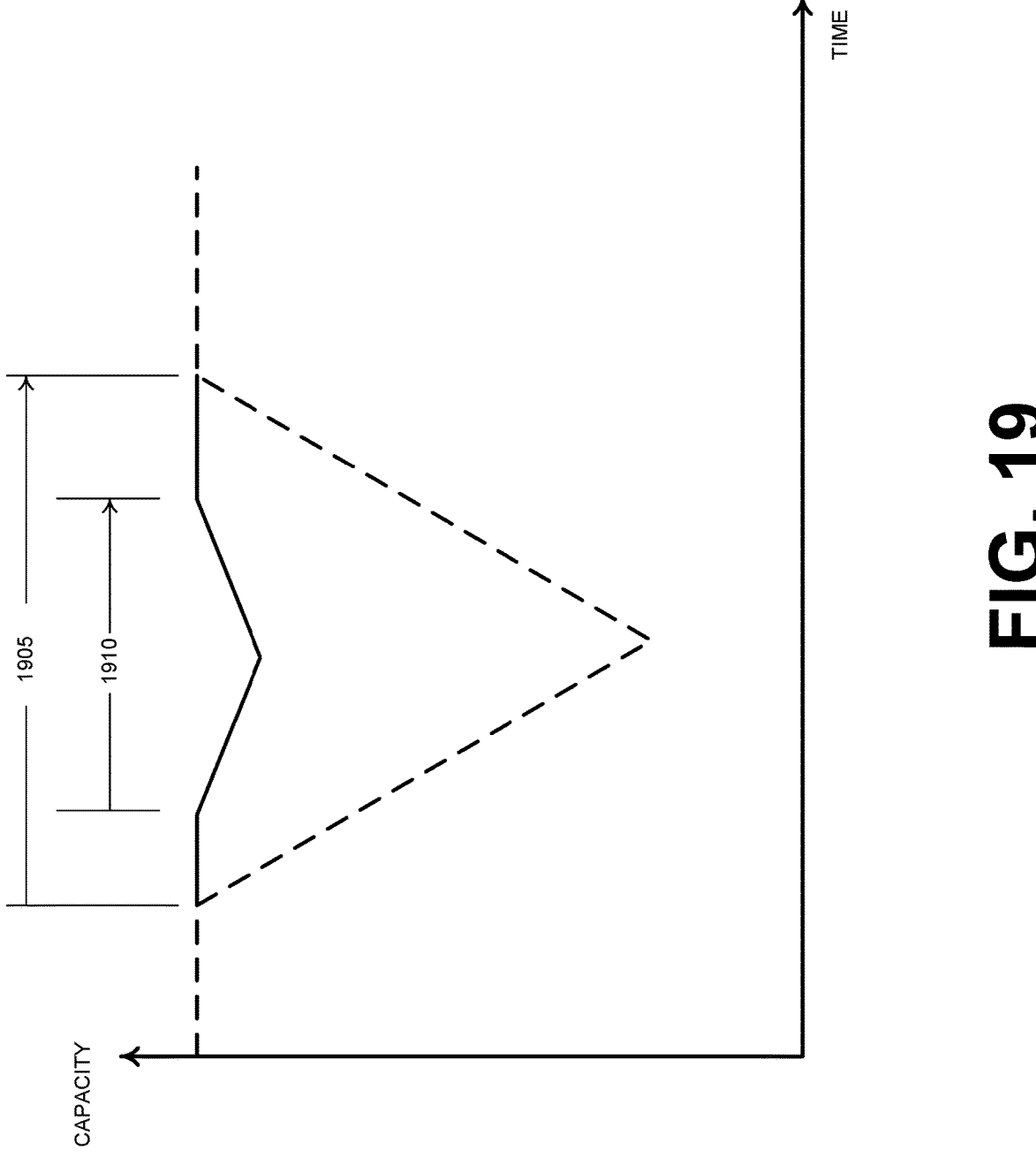
FIG. 19 illustrates a graph of resource starvation due to overhead signaling using conventional techniques to handover multiple user equipment.

Embodiments disclosed herein may associate NES-triggered handover signaling overhead to available downlink beams instead of active devices to be handed over. In the example described above with 640 user equipment of 1,280 user equipment to be handed over from sixty-four of a total 128 downlink beams, assuming user equipment devices are uniformly distributed with respect to multiple downlink beams corresponding to radio access network node, associated signaling overhead is proportional to half of the beams (e.g., 64 beams) for simultaneously offloading 50% of active device connections, instead of being proportional to the actual number of the active devices to be handed over, e.g., 640 devices. Thus, resource starvation may occur as shown by dashed lines in FIG. 19, with network capacity of a radio access network node being severely degraded during period 1905 when per-device handover signal messages are being communicated according to conventional techniques. Using embodiments disclosed herein may result in avoiding severe network capacity starvation as shown by the solid line during period 1910 while still performing handover of a large number of user equipment devices.

According to different embodiments disclosed herein, a RAN node may operate with different levels of information and control, and different sizes of signaling overhead may be used. According to an embodiment, unlike with conventional handover techniques according to which a RAN node may separately indicate to each of multiple user equipment a handover using dedicated control signaling, minimal signaling overhead may be used by a RAN node by using a beam-specific handover to facilitate a handover of multiple user equipment being served by a downlink beam corresponding to the RAN node. In another embodiment disclosed herein, a RAN node may explicitly indicate specific device identifiers corresponding to specific user equipment to be handed over to nearby RAN nodes per beam using a device-group-common control signaling message. Due to multiple devices decoding the same handover control information/message, device identity masking may be used to avoid revealing actual identities of user equipment via the device-group-common handover control signaling.

Embodiments disclosed herein facilitate beam-specific handover of a group of user equipment devices to nearby RAN nodes with minimal signaling overhead by a current serving RAN node activating an NES mode. In an embodiment, a device-group-common downlink control channel is defined and associated with an available downlink beam corresponding to a serving RAN node. In an embodiment, user equipment devices being served by a downlink beam may monitor and decode the novel control channel if a received signal signal strength, or coverage level, is below a predefined and preconfigured criterion, which may be a threshold. Use of signal strength criterion to determine, by a user equipment, whether to monitor a control channel may facilitate a RAN node avoid excessive device offloading to nearby cells, which may be desirable to avoid offloading of user equipment devices experiencing excellent channel conditions as part of the NES offloading since user equipment experiencing good channel conditions/good signal strength typically do not require energy-heavy radio operations (e.g., the user equipment can operate with relaxed reference signal patterns, relaxed control channel transmissions, etc. due to the excellent signal strength/channel conditions). Thus, offloading devices experiencing good channel conditions may not result in an NES gain with respect to energy that might be consumed in communicating with the same user equipment if handed over to a different beam of a different RAN node. The novel beam-specific control channel may deliver scheduling information corresponding to a device-group handover information message to be transmitted to user equipment that may comprise one or more target RAN node identifiers corresponding to RAN nodes to which the user equipment may have been handed over. User equipment devices may decode the control channel information and the scheduled handover information message, and initiate handover and connection establishment with one of the indicated target RAN nodes that offers a best, or strongest, received coverage level. Accordingly, handover of multiple user equipment of a user equipment group may be facilitated with minimal signaling overhead that is proportional to the number of downlink beams serving the to-be-handed-over devices instead of being proportional to the number of user equipment being handed over.

However, the RAN node handing over user equipment to another RAN node may not have information regarding whether specific user equipment was in fact handed over or information regarding which target RAN node to which a user equipment was handed over (e.g., best effort handover), except when a handed-over user equipment begins connection establishment to an indicated target RAN node. A target RAN node may extract context information corresponding to a handed-over device from the current serving RAN, which may be referred to as a source RAN node.

Furthermore, in another implementation option, a list of to-be-handed-over device identifiers may be included as part of the device group control channel message. However, the device identifiers may be NES-specific identifiers that are preconfigured separately for each device (when devices first establish a connection with current RAN node) and are associated with the devices' real identifiers (e.g., International Subscriber Mobile Identity ("IMSI")). Thus, a RAN node may include multiple device identifiers in a single handover control message per beam while still masking the identity of each device from other user equipment that may receive the same handover control message. Therefore, handed-over user equipment devices, triggering handover to target RAN nodes, may facilitate handover verification by separately sharing the user equipment devices' NES-specific identifiers, versus sharing real identifiers, towards target RAN nodes selected by the user equipment, usable by target RAN nodes to verify identities of the handed over user equipment devices by matching user equipment NES-specific identities with real identities Accordingly, a RAN node implementing NES mode (e.g., a source RAN node) may specify which user equipment devices should be handed over from a downlink beam while still adopting optimized and low overhead handover control signaling. (e.g., a single handover command control message per beam).

Turning now to FIG. 2, environment 200 comprises user equipment of user equipment group 205 and user equipment of user equipment group 210. Embodiments disclosed herein may facilitate source RAN 105A implementing a beam-specific handover of one or more user equipment to achieve network energy saving. For example, radio access network node 105A may determine to deactivate beam 213 and beam 214. Accordingly, radio access network node 105A may implement handover of user equipment corresponding to user equipment group 210 from being served by radio access network node 105A to being served by radio access network node 105B, while beam 211 and beam 212 remain active with respect to radio access network node 105A, and thus user equipment corresponding to user equipment group 205 may continue to be served by beam 211 and beam 212. A device-common downlink control channel may be defined corresponding to each downlink beam. Thus, upon activating NES mode with respect to beam 213 and beam 214, RAN node 105A may transmit a handover indication via one or more handover control channels respectively corresponding to beam 213 and beam 214. Therefore, RAN node 105A may trigger group handover of user equipment corresponding to user equipment group 210 via a single handover control message, for all or part of the devices being served by a set of beams, for example beam 213 and beam 214, without the need to separately perform overhead-resource-heavy handover procedures for each of the to-be-handed over devices corresponding to user equipment group 210.

In an example shown in FIG. 3, handover downlink control channel resources 320 may be defined and may be associated in network energy saving handover configuration 307 with downlink beam 305. Handover downlink control channel resources 320 may be referred to herein as first resources. Configuration 307 may be received when a user equipment, such as, for example, user equipment 115A or user equipment 115B, establishes a communication connection with radio access network node 105A or when the user equipment begins being served by downlink beam 305. Configuration 307 may be specific to beam 305. Accordingly, user equipment 115A and user equipment 115B, when currently served by beam 305, may monitor and decode handover downlink control channel resources 320 associated with beam 305. Control channel 320 may comprise a device-group network energy saving handover configuration indication 310 that comprises a beam-specific second resource indication indicative of a second resource, or second resources, 325 corresponding to serving downlink beam 305. Second resource(s) 325 may be usable by the one or more user equipment (e.g., UE 115A or UE 115B) to receive network energy saving handover information messages comprising handover information.

Radio access network node 105A may transmit to at least one of user equipment 115A or 115B, according to the second resource(s) 325, a network energy saving handover information message 315 comprising handover information to be used for at least one handover by at least one of UE 115A or UE 115B being served by beam 305. Network energy saving handover information message 315 may comprise NES-triggered handover information and/or device identifiers of to-be-handed over devices.

An example handover configuration 307, which may facilitate active user equipment using beam-specific handover signaling, is shown in FIG. 4. When an active user equipment performs connection establishment with a radio access network node, the user equipment may receive the beam specific handover configuration 307. Beam-specific handover configuration 307 may comprise downlink control channel search space information 420 indicative of first resources 320 (e.g., control channel timing and frequency resource information) shown in FIG. 3. As described in reference to FIG. 3, resource(s) 320 may be used to carry an indication 310 that may be indicative of scheduling information (e.g., indication of second resources 325 shown in FIG. 3) to be used to carry network energy saving handover information message 315, as shown in FIG. 3. Message 315 may be referred to as a group handover command.

Continuing with description of FIG. 4, for best effort NES handover, a RAN node may determine to offload an unknown number of active devices per beam. Minimum beam specific coverage criterion 415, which may be a threshold, may be configured to facilitate a user equipment determining to skip a NES group handover indicated by message 315 described in reference to FIG. 3. If a user equipment determines that a signal strength, or coverage level of a signal received from a radio access network node exceeds criterion 415, the user equipment skip monitoring of control channel resources 320 indicated by indication 420 shown in FIG. 4. Thus, if a user equipment determines not to monitor beam handover control channel resource 320, the user equipment may not be handed over according to handover information contained in message 315. However, if a user equipment determines that a receive signal strength/coverage level is below criterion 415 (e.g., criterion 415 is violated or is not satisfied), the user equipment may monitor, or resume monitoring, NES group handover control channel resource 320 for indication of potential handover commands.

Configuration 307 may comprise NES-specific device identifiers 410, corresponding to devices receiving configuration 307, to facilitate controlled NES handover. Identifiers 410 may be referred to as temporary identifiers or mask identifiers. A RAN node may determine specific user equipment devices to be handed over due to NES activation and may determine a NES specific device identifier corresponding to each user equipment to potentially be handed over. An NES-specific identifier 410 may correspond to a real identifier (e.g., an international mobile subscriber identity ("IMSI")), and may be used for NES handover to hide, or mask, a given user equipment's identity from other user equipment that may receive configuration 307. When a RAN node triggers NES handover for one or more user equipment devices, the RAN node may include NES specific identifiers 410 in message 315 instead of real identities since handover command/handover information message 315 may be decoded by multiple user equipment devices. Thus, use of NES-specific identifiers 410 may mask true identifies of handed over devices from other user equipment.

Figure 5:
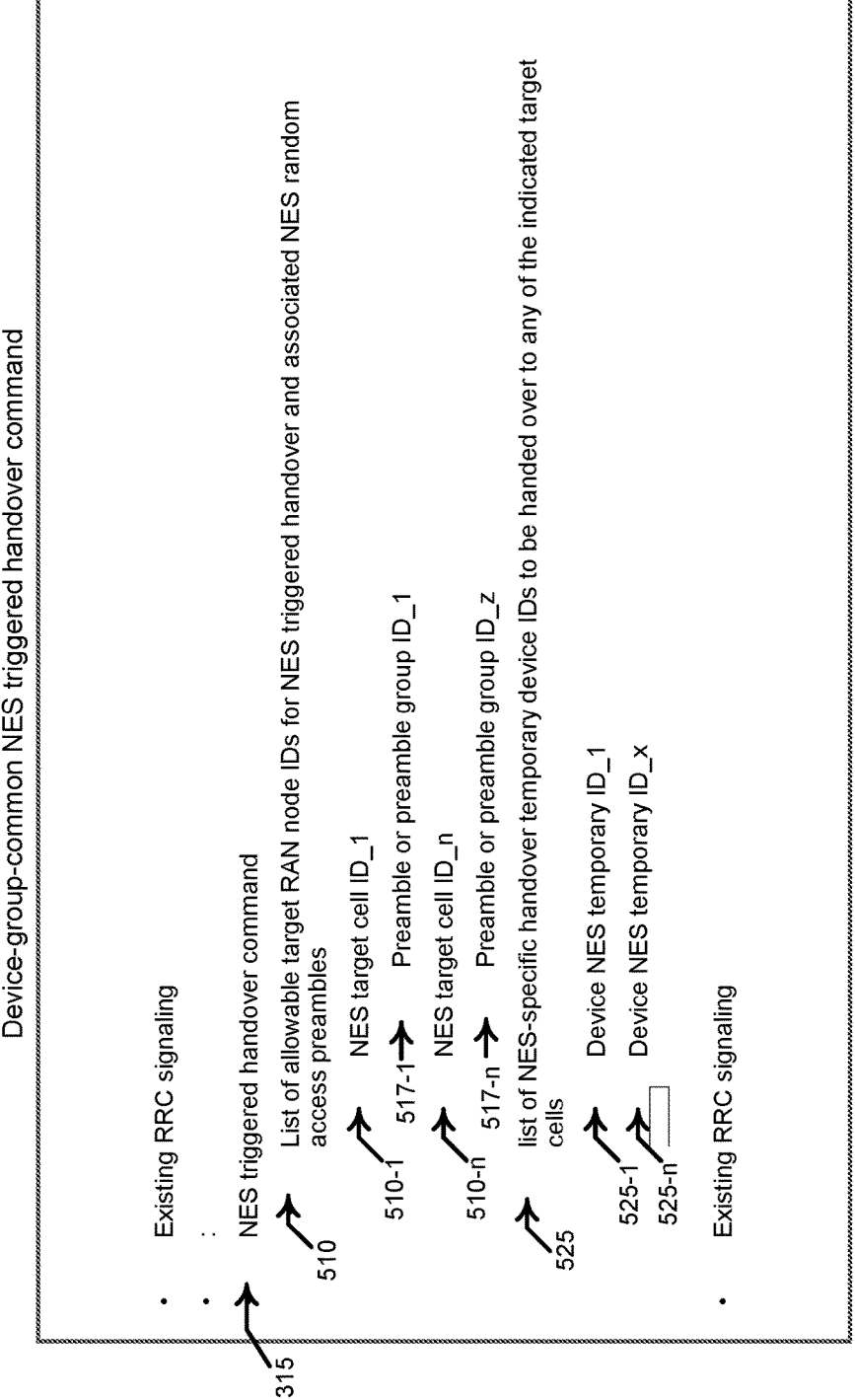
FIG. 5 illustrates an example network energy saving network energy saving handover information message.

FIG. 5 shows an example network energy saving handover information message 315. Message 315 may comprise a target RAN node list 510 indicative of RAN node identifiers 510-1-510-n corresponding to RAN nodes to which user equipment receiving message 315 may be handed over. Message 315 may comprise handover preambles, or handover preamble group identifiers, 517-1-517-n associated with respective indicated RAN node identifiers 510. Message 315 may comprise a device handover list 525 comprising device identifiers 525-1-525-n corresponding to user equipment to be handed over. Device identifiers 525 may comprise identifier(s) 410 described in reference to FIG. 4.

Figure 6:
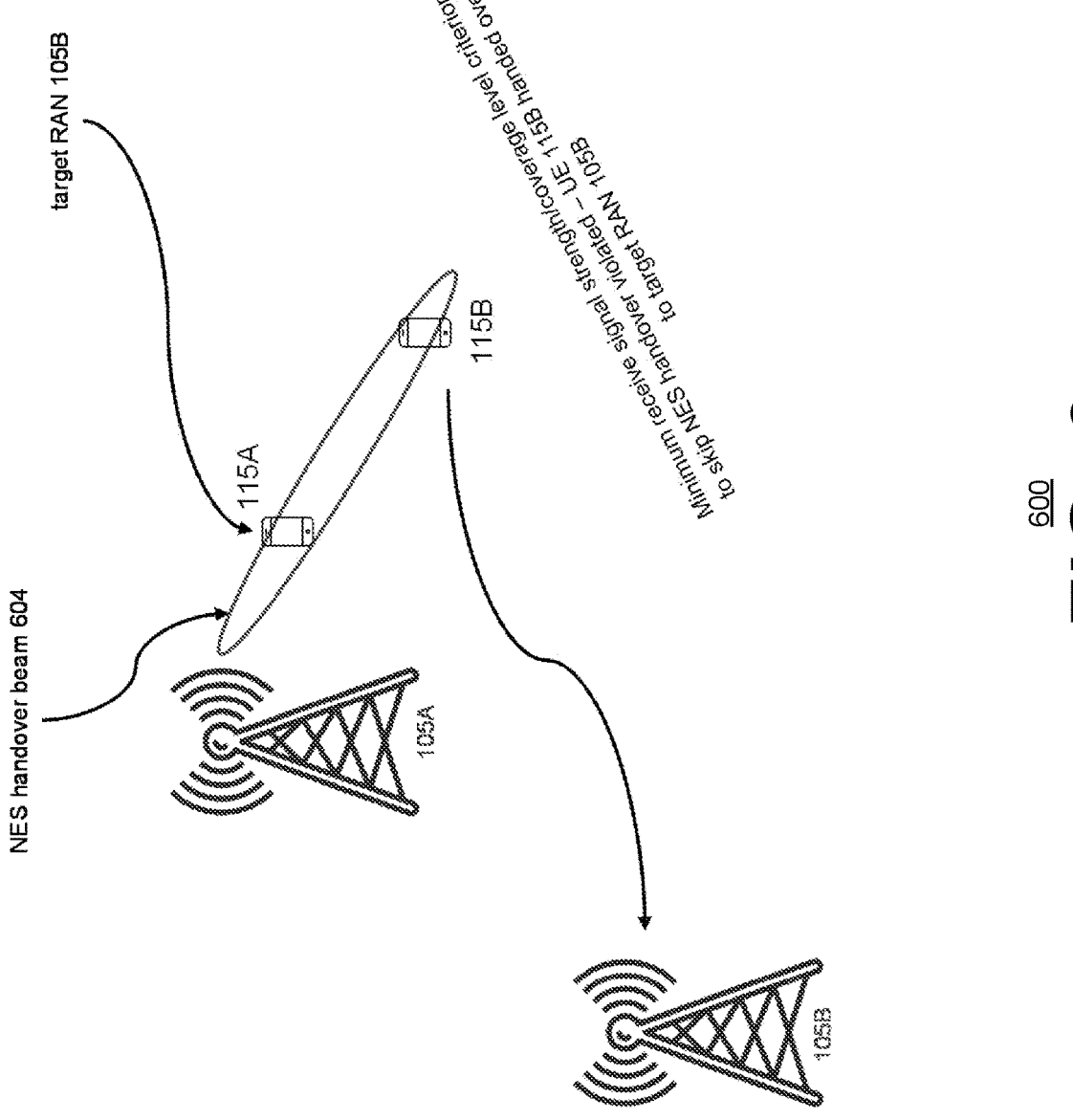
FIG. 6 illustrates handover of a user equipment based on a beam-specific handover coverage criterion being violated.

Turning now to FIG. 6, the figure illustrates, with respect to downlink beam 604, user equipment 115B triggering NES handover towards RAN node 105B that may be indicated in a handover information message. In an embodiment, UE 115B may trigger handover from being served by RAN 105A to RAN 105B when, for best effort NES handover, a received signal strength/coverage level corresponding to beam 604 is below a configured criterion/threshold. In another embodiment, a received handover information message, such as message 315, may comprise NES-specific device identifier 410, which may have been configured via a configuration 307 described in reference to FIG. 3.

Figure 7:
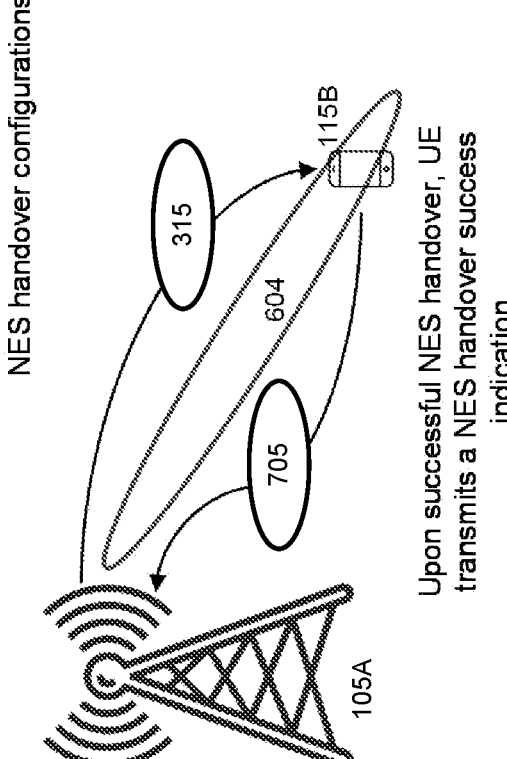
FIG. 7 illustrates a user equipment transmitting a handover success message indicative that the user equipment has been successfully handed over to a target radio access network node.

Turning now to FIG. 7, the figure illustrates an embodiment according to which to-be-handed over user equipment

115B may transmit to RAN 105A an uplink control channel handover success message 705 indicating a successful NES handover to RAN 105B. Transmission of a handover success message may be beneficial with respect to a best effort NES handover of user equipment devices that are not identified in list 525 in handover information message/handover command 315. Transmitting handover success message 705 may facilitate further reducing downlink handover signaling overhead if source RAN node 105A needs to determine whether UE 115B has been handed over to another RAN node. In an embodiment, transmission of handover success message 705 may not be performed based on a type of traffic corresponding to UE 115B. For example, if traffic corresponding to UE 115B is best effort traffic, handover success message 705 may not be transmitted to source RAN 105A.

Turning now to FIG. 8, the figure illustrates a timing diagram of an example method 800. At act 805, RAN node 105 may transmit a network energy saving handover configuration, such as configuration 307 described in reference to FIGS. 3 and 4, to UE/WTRU 115 via device-specific RRC/DCI signaling. Configuration 307 may comprise a NES handover temporary device identifier corresponding to UE/WTRU 115, such as an identifier 410 described in reference to FIG. 4, associated with a device-specific connected mode real identifier, such as an IMSI, corresponding to UE/WTRU 115. Configuration 307 may comprise a device-group-common control channel search space resource information element indicative of a first resource, corresponding to a serving downlink beam configured to serve UE 115, usable by UE 115 to receive network energy saving handover configuration indications. The first resource may be a resource corresponding to beam specific network energy saving mode handover control channel search space 320, described in reference to FIG. 3, which may be used to carry a NES-triggered handover indication, which may be referred to as a network energy saving handover configuration indication, such as indication 310 described in reference to FIG. 3. Configuration 307 may comprise a beam-specific handover coverage criterion, which may be a minimum received coverage level (e.g., in terms of dB) threshold, that UE 115 may use to evaluate a received signal's signal strength to determine whether to skip monitoring search space 320 corresponding to the first resource and to skip attempting an NES-triggered handover.

On condition of RAN 105 activating an NES mode and a device-controlled NES triggered handover, at act 810 RAN node 105 may transmit a network energy saving handover configuration indication (e.g., indication 310 described in reference to FIGS. 3 and 4) as a downlink control channel information message, via the configured NES triggered handover control search space first resource configured via configuration 307 at act 805. Handover configuration indication 310 may comprise scheduling information corresponding to a group common handover command to be delivered via RRC signal messaging. The group common handover command may be referred to as a network energy saving handover information message, such as network energy saving handover information message described in reference to FIGS. 3 and 5. Network energy saving handover information message 315 may comprise information elements, such as, for example, a list (e.g., list of identifiers 510 described in reference to FIG. 5) of allowable target RAN node identifiers available for UE 115 to be handed over. Network energy saving handover information message 315 may comprise random access preambles (e.g., RACH preambles) or preamble group indications, (e.g., information elements 517 shown in FIG. 5) corresponding to RAN identifiers 510, to be used for random access with respect to the indicated target RAN nodes/cells corresponding to identifiers 510. Network energy saving handover information message 315 may comprise information elements 525 that indicate NES-specific handover temporary device identifiers, such as identifiers 410 that may have been included in configuration 307, corresponding to user equipment, including UE 115, to be handed over to any of the indicated target cells indicated in information elements 510.

At act 815, RAN node 105 may receive an NES handover success message from UE 115 indicative that a signal strength of a signal received from RAN 105 satisfied a criterion for handover. (e.g., the signal strength was below a criterion included in information element 415 of configuration 307 transmitted at act 805) and that UE 115 has been handed over to a target RAN node. At act 820, RAN node 105 may halt serving UE 115 and may flush a device context corresponding to UE 115.

Turning now to FIG. 9, the figure illustrates a timing diagram of an example method 900. At act 905, WTRU/UE 115 may receive a network energy saving handover configuration, such as configuration 307 described in reference to FIGS. 3 and 4, from serving NES-capable RAN node 105 via device-specific RRC/DCI signaling messaging. Configuration 307 may comprise a NES handover temporary device identifier, such as an identifier 410 described in reference to FIG. 4, associated with a device-specific connected mode real identifier, such as an IMSI. Configuration 307 may comprise a device-group-common control channel search space resource information element indicative of a first resource, corresponding to a serving downlink beam configured to serve UE 115 and usable by UE 115 to receive network energy saving handover configuration indications. The first resource may be a resource corresponding to beam specific network energy saving mode hand over control channel search space 320, described in reference to FIG. 3, which may be used to carry a NES-triggered handover indication, which may be referred to as a network energy saving handover configuration indication, such as indication 310 described in reference to FIG. 3. Configuration 307 may comprise a beam-specific handover coverage criterion, which may be a minimum received coverage level (e.g., in terms of dB) threshold, that UE 115 may use to evaluate a received signal's signal strength to determine whether to skip monitoring search space 320 corresponding to the first resource and to skip attempting an NES-triggered handover.

At act 910, on condition of UE 115 determining that the beam-specific handover coverage criterion contained in configuration 307 is not satisfied (if UE 115 determines that the criterion is satisfied the UE may determine to skip monitoring of the control channel search space resource 320), UE/WTRU 115 may monitor and blindly decode the signaled NES control channel search space 320. From information decoded from search space 320, UE/WTRU 115 may monitor a second resource indicated by information obtained by decoding search space 320. The information indicated in search space 320 may correspond to a handover configuration indication, such as indication 310 described in reference to FIG. 3.

At act 915, UE/WTRU may extract from the second resource a network energy saving handover information message comprising handover information, such as, for example, information contained in network energy saving handover information message 315 described in reference to FIGS. 3 and 5. From the network energy saving handover information message, UE/WTRU 115 may determine, at act 915, potential target RAN nodes/cells from a list of target cell identifiers. Based on the network energy saving handover information message, UE/WTRU 115 may determine whether UE/WTRU 115 corresponds to a temporary user equipment identifier contained in a list of temporary device identifiers. UE/WTRU 115 may determine correspondences of an identifier that corresponds to an identifier listed in the list of temporary user equipment identifiers based on information contained in configuration 307 received at act 905.

At act 920, on condition of a temporary user equipment identifier contained in the network energy saving handover information message corresponding to a temporary identifier corresponding to UE/WTRU 115 and one or more target cell identifiers corresponding to RAN nodes that UE 115 has determined satisfy a conventional handover criterion, for example a signal strength above a configured criterion, UE/WTRU 115 may initiate NES handover to one of the target nodes/cells indicated in the network energy saving handover information message. (It will be appreciated that the conventional handover criterion is different from the beam-specific handover coverage criterion that may be contained in configuration 307.) After initiating handover to a target RAN node other than source RAN node, 115 UE/WTRU may halt current transmissions and/or reception with respect to current serving source RAN node 115. At act 925, UE/WTRU may transmit to source RAN 105 a handover success message indicating to the source RAN that NES-triggered handover according to the network energy saving handover information message was successful. The handover success message may be transmitted via a device-specific uplink control channel resource or via a device-group-common uplink control channel resource.

Turning now to FIG. 10, the figure illustrates a flow diagram of an example method 1000. Method 1000 begins at act 1005. At act 1010, a source radio access network node may transmit a network energy saving beam-specific handover configuration, for example, configuration 307 described in reference to FIGS. 3 and 4. At act 1015, the source radio access network node may determine to implement a network energy saving mode. The source radio access network node may determine to implement the network energy saving mode with respect to one or more specific beams, for example a downlink beam serving a user equipment. At act 1020, the source radio access network node may transmit a network energy saving handover configuration indication according to a first resource indicated in the handover configuration transmitted at act 1010. The first resource may be a network energy saving beam-specific control channel search space resource, such as control channel search space resource 320 described in reference to FIG. 3. The network energy saving handover configuration indication may comprise scheduling information corresponding to a second resource, for example resource 325 described in reference to FIG. 3. The second resource may be usable by the user equipment to retrieve network energy saving handover information from a network energy saving handover information message, such as handover information message 315 described in reference to FIGS. 3 and 5.

At act 1025, the user equipment may determine whether the handover configuration transmitted at act 1010 comprises a network energy saving handover criterion, for example, a signal strength value. If a determination is made at act 1025 that the handover configuration comprises a network energy saving handover criterion, method 1000 advances to act 1030. At act 1030, the user equipment may determine whether the network energy saving handover criterion is satisfied. For example, if a signal strength, corresponding to a signal received from the source radio access network node via a beam to which the hand over configuration corresponds, exceeds the network energy saving handover criterion, which may be a threshold, method 1000 advances to act 1035 and the user equipment continues to be served by the source radio access network node.

If the handover configuration transmitted at act 1010 does not comprise a network energy saving handover criterion, or if the configuration transmitted at act 1010 comprises a network energy saving handover criterion but the network energy saving handover criterion is not satisfied, method 1000 advances to act 1040. At act 1040, the user equipment may monitor and decode the first resource/control channel search space resource (e.g., resource 320 described in reference to FIG. 3). At act 1045, the user equipment may retrieve, from the control channel search space resource, scheduling information corresponding to a second resource. At act 1050, the user equipment may monitor, decode, or extract network energy saving handover information from a network energy saving handover information message according to the scheduling information contained in the network energy saving handover configuration indication transmitted at act 1020.

At act 1055, the user equipment may determine from the network energy saving information whether the user equipment is indicated in the network energy saving handover information message. If the user equipment determines at act 1055 that the user equipment is not indicated in the network energy saving handover message, the user equipment continues to be served by the source radio access network node at act 1035.

If the user equipment determines at act 1055 that the user equipment is indicated in the network energy saving handover message, at act 1060 the user equipment initiates handover of the user equipment to a target radio access network node indicated in the network energy saving handover information message. The user equipment may determine the target radio access network node from multiple radio access network nodes identified in the network energy saving handover information message based on which of the multiple radio access network nodes provides a strongest signal strength to the user equipment. Upon successful handover to the target radio access network node, at act 1065 the user equipment may transmit to the source radio access network node a handover success message indicating to the source radio access network node that the user equipment has been successfully handed over to the target radio access network node. At act 1070, the source radio access network node may flush context information corresponding to the user equipment being served by the source radio access network note. Method 1000 ends at act 1075.

With respect to the handover success message transmitted to the source radio access network node at act 1065, the handover success message may facilitate the source radio access network node being apprised that the user equipment has been successfully handed over to another radio access network node. This is useful because conventionally a radio access network node specifically instructs a user equipment to hand over to another radio access network node. However, because, for example, at act 1030 the user equipment may itself determine, based on channel conditions corresponding to potential target radio access network nodes identified in a network energy saving handover information message, to initiate handover to a target radio access network node, the source radio access network node may not have information indicative of whether the user equipment has been successfully handed over because the source radio access network node and the target radio access network node may have not coordinated with each other via backhaul communication links. Thus, the source radio access network node may continue to retain context information relative to the user equipment even after the user equipment has been handed over. By transmitting, to the source radio access network node, the novel handoff success message, the source radio access network node may free up resources that may have been otherwise assigned to the user equipment instead of keeping those resources assigned to the user equipment while the user equipment is already operating with the target radio access network node.

The network energy saving handover information message may comprise user equipment identifiers or temporary user equipment identifiers corresponding to all user equipment that are currently being served by a downlink beam with respect to which the radio access network node has determined to implement network energy saving mode. The network energy saving handover information message may comprise user equipment identifiers or temporary user equipment identifiers corresponding to fewer than all user equipment that are currently being served by a downlink beam with respect to which the radio access network node has determined to implement network energy saving mode. Accordingly, the source radio access network node may determine whether to completely halt operation according to a particular downlink beam by instructing, via a network energy saving handover information message, that all user equipment being served by the downlink being be handed over to a target radio access network node, or whether to only instruct that only specified user equipment being served by the particular downlink beam be handed over, based on channel conditions corresponding to the downlink beam and relative to the certain user equipment. Thus, if some user equipment being served by a downlink beam are experiencing good channel conditions with respect to the source radio access network node and thus may not require conservative, processing-heavy (thus power-consumption-heavy) radio functions to facilitate communicating traffic with the user equipment, the user equipment experiencing the good channel conditions may continue being served by the downlink beam and other user equipment served by the downlink beam and that are not experiencing good channel conditions with respect to the source radio access network node may be handed over to a target radio access network node thus reducing power consumption at the source radio access network node due to processing-heavy radio functionality being avoided when the user equipment experiencing the poor channel conditions are handed over to a target radio access network node.

Turning now to FIG. 11, the figure illustrates an example embodiment method 1100 comprising at block 1105 facilitating, by a radio access network node comprising a processor, transmitting, to one or more user equipment, a network energy saving handover configuration comprising a beam-specific first resource indication indicative of a first resource, corresponding to a serving downlink beam configured to serve the one or more user equipment, usable by the one or more user equipment to receive network energy saving handover configuration indications; at block 1110 facilitating, by the radio access network node, transmitting, to at least one of the one or more user equipment, a network energy saving handover configuration indication, via the first resource, comprising a beam-specific second resource indication indicative of a second resource, corresponding to the serving downlink beam, usable by the one or more user equipment to receive network energy saving handover information messages comprising handover information; at block

1115 facilitating, by the radio access network node, transmitting, to the least one of the one or more user equipment according to the second resource, a network energy saving handover information message comprising handover information to be used for at least one handover by the least one of the one or more user equipment; at block 1120 facilitating, by the source radio access network node, receiving, from the at least one of the one or more user equipment, a handover success message indicative that the at least one of the one or more user equipment has been successfully handed over to a target radio access network node; and at block 1125 responsive to the handover success message, terminating, by the source radio access network node, at least one communication context corresponding to the at least one of the one or more user equipment.

Turning now to FIG. 12, the figure illustrates a first radio access network node 1200, comprising at block 1205 a processor configured to transmit, to a first user equipment, a network energy saving handover configuration comprising a beam-specific first resource indication indicative of a first resource, corresponding to a first serving downlink beam, associated with the first radio access network node, configured to serve the first user equipment, usable by the first user equipment to receive network energy saving handover configuration indications; at block 1210 determine to operate according to a network energy saving mode to result in a determined network energy saving mode; at block 1215 transmit a network energy saving handover configuration indication, via the first resource, comprising a beam-specific second resource indication indicative of a second resource, corresponding to the first serving downlink beam, usable, by the first user equipment and a second user equipment being served by the first serving downlink beam, to receive network energy saving handover information messages comprising handover information; at block 1220 transmit, according to the second resource, a network energy saving handover information message comprising handover information, usable by the first user equipment and the second user equipment to facilitate being handed over from being served by the first serving downlink beam to being served by a second serving downlink beam associated with a second radio access network node; at block 1225 wherein the network energy saving handover configuration further comprises a beam-specific handover coverage criterion usable by the first user equipment and the second user equipment to determine to monitor the first resource; at block 1230 receive from the first user equipment or the second user equipment, a first handover success message or a second handover success message, respectively indicative that serving of the first user equipment or the second user equipment was successfully handed over to being served by the second serving downlink beam; and at block 1235 responsive to the first handover success message or the second handover success message, terminate, respectively, a first communication context corresponding to the first user equipment or a second communication context corresponding to the second user equipment.

Turning now to FIG. 13, the figure illustrates a non-transitory machine-readable medium 1300 comprising at block 1305 executable instructions that, when executed by a processor of a network node that is part of a radio access network, facilitate performance of operations, comprising serving, via a serving beam, a set of user equipment; at block 1310 configuring the set of user equipment with a network energy saving handover configuration comprising a beam-specific first resource indication indicative of a first resource, corresponding to the serving beam, usable by the set of user equipment to receive network energy saving handover configuration indications; at block 1315 broadcasting, via the first resource, a network energy saving handover configuration indication comprising a beam-specific second resource indication indicative of a second resource, corresponding to the serving beam, indicative to the set of user equipment to receive network energy saving handover information messages comprising handover information; and at block broadcasting, to the set of user equipment via the second resource, a network energy saving handover information message comprising handover information.

Turning now to FIG. 14, the figure illustrates an example embodiment method 1400 comprising at block 1405 receiving, by a user equipment comprising a processor from a first radio access network node, a network energy saving handover configuration comprising a beam-specific first resource indication indicative of a first resource, corresponding to a serving beam configured to serve the user equipment, usable by user equipment to receive beam-specific network energy saving handover configuration indications; at block 1410 performing, by the user equipment, at least one network energy saving handover operation according to the network energy saving handover configuration; at block 1415 wherein the network energy saving handover configuration further comprises a beam-specific handover coverage criterion usable by user equipment to determine to monitor the first resource, wherein the at least one network energy saving handover operation comprises; at block 1420 determining a signal strength corresponding to the serving beam to result in a determined serving beam signal strength; at block 1425 analyzing the determined serving beam signal strength with respect to the beam-specific handover coverage criterion to result in an analyzed serving beam signal strength; at block 1430 based on the analyzed serving beam signal strength satisfying the beam-specific handover coverage criterion, receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information; at block 1435 receiving, by the user equipment according to the second resource, a network energy saving handover information message comprising handover information; and at block 1440 transmitting, to a second radio access network node according to the handover information, a handover request.

Turning now to FIG. 15, the figure illustrates an example user equipment 1500, comprising at block 1505 a processor configured to receive, from a serving radio access network node, a network energy saving handover configuration comprising a beam-specific first resource indication indicative of a first resource, corresponding to a serving beam configured to serve a set of user equipment comprising the user equipment and usable by the set of user equipment to receive beam-specific network energy saving handover configuration indications, and a beam-specific handover coverage criterion usable by the set of user equipment to determine to monitor the first resource; at block 1510 determining a signal strength corresponding to the serving beam to result in a determined serving beam signal strength; at block 1515 analyze the determined serving beam signal strength with respect to the beam-specific handover coverage criterion to result in an analyzed serving beam signal strength; at block 1520 based on the analyzed serving beam signal strength satisfying the beam-specific handover coverage criterion, receive a network energy saving handover configuration indication, via the first resource, comprising a beam-specific second resource indication indicative of a second resource, corresponding to the serving beam, usable by user equipment to receive network energy saving handover information messages comprising handover information; at block 1525 receive, by the user equipment according to the second resource, a network energy saving handover information message comprising handover information; and at block 1530 transmit, to a target radio access network node according to the handover information, a handover request.

Turning now to FIG. 16, the figure illustrates a non-transitory machine-readable medium 1600 comprising at block 1605 executable instructions that, when executed by a processor of a user equipment, facilitate performance of operations, comprising receiving, from a source radio access network node, a network energy saving handover configuration comprising a beam-specific first resource indication indicative of a first resource, corresponding to a serving beam configured to serve the user equipment, usable, by a group of user equipment that comprises the user equipment, to receive beam-specific network energy saving handover configuration indications, wherein the network energy saving handover configuration further comprises a user equipment identifier corresponding to the user equipment; at block 1610 based on correspondence of the user equipment identifier to the user equipment, receiving a network energy saving handover configuration indication, via the first resource, comprising a beam-specific second resource indication indicative of a second resource, corresponding to the serving beam, usable by user equipment of the group of user equipment, to receive network energy saving handover information messages comprising handover information; at block 1615 receiving, by the user equipment according to the second resource, a network energy saving handover information message comprising handover information; at block 1620 transmitting, to a target radio access network node according to the handover information, a handover request; and at block 1625 wherein the first resource comprises a control channel resource and wherein the second resource comprises a data channel resource.

Figure 17:
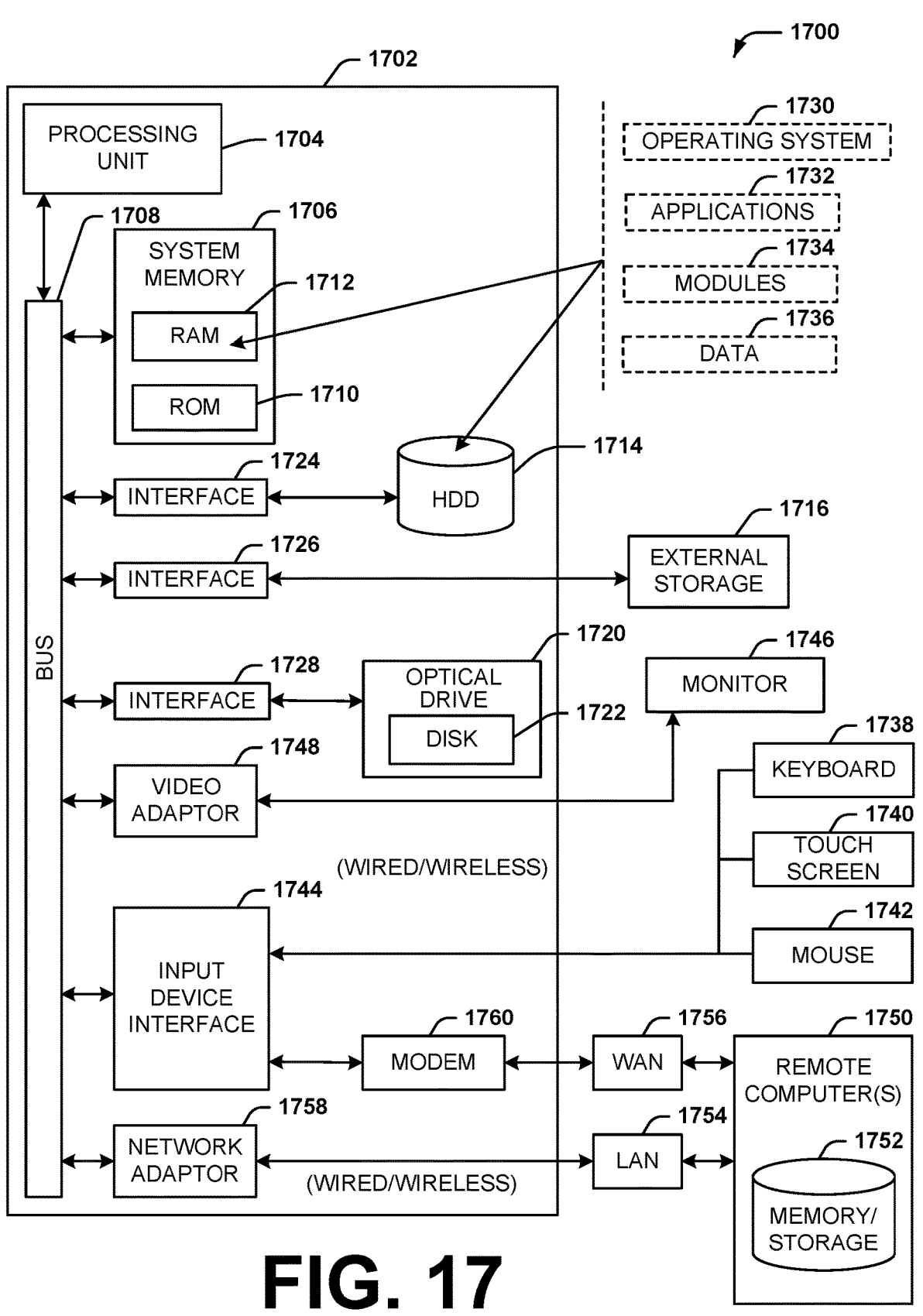
FIG. 17 illustrates an example computer environment.

In order to provide additional context for various embodiments described herein, FIG. 17 and the following discussion are intended to provide a brief, general description of a suitable computing environment 1700 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 17, the example environment 1700 for implementing various embodiments of the aspects described herein includes a computer 1702, the computer 1702 including a processing unit 1704, a system memory 1706 and a system bus 1708. The system bus 1708 couples system components including, but not limited to, the system memory 1706 to the processing unit 1704. The processing unit 1704 can be any of various commercially available processors and may include a cache memory. Dual microprocessors and other multi-processor architectures can also be employed as the processing unit 1704.

The system bus 1708 can be any of several types of bus structure that can further interconnect to a memory bus (with or without a memory controller), a peripheral bus, and a local bus using any of a variety of commercially available bus architectures. The system memory 1706 includes ROM 1710 and RAM 1712. A basic input/output system (BIOS)

can be stored in a non-volatile memory such as ROM, erasable programmable read only memory (EPROM), EEPROM, which BIOS contains the basic routines that help to transfer information between elements within the computer 1702, such as during startup. The RAM 1712 can also include a high-speed RAM such as static RAM for caching data.

Computer 1702 further includes an internal hard disk drive (HDD) 1714 (e.g., EIDE, SATA), one or more external storage devices 1716 (e.g., a magnetic floppy disk drive (FDD) 1716, a memory stick or flash drive reader, a memory card reader, etc.) and an optical disk drive 1720 (e.g., which can read or write from a CD-ROM disc, a DVD, a BD, etc.). While the internal HDD 1714 is illustrated as located within the computer 1702, the internal HDD 1714 can also be configured for external use in a suitable chassis (not shown). Additionally, while not shown in environment 1700, a solid-state drive (SSD) could be used in addition to, or in place of, an HDD 1714. The HDD 1714, external storage device(s) 1716 and optical disk drive 1720 can be connected to the system bus 1708 by an HDD interface 1724, an external storage interface 1726 and an optical drive interface 1728, respectively. The interface 1724 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1702, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1712, including an operating system 1730, one or more application programs 1732, other program modules 1734 and program data 1736. All or portions of the operating system, applications, modules, and/or data can also be cached in the RAM 1712. The systems and methods described herein can be implemented utilizing various commercially available operating systems or combinations of operating systems.

Computer 1702 can optionally comprise emulation technologies. For example, a hypervisor (not shown) or other intermediary can emulate a hardware environment for operating system 1730, and the emulated hardware can optionally be different from the hardware illustrated in FIG. 17. In such an embodiment, operating system 1730 can comprise one virtual machine (VM) of multiple VMs hosted at computer 1702. Furthermore, operating system 1730 can provide runtime environments, such as the Java runtime environment or the .NET framework, for applications 1732. Runtime environments are consistent execution environments that allow applications 1732 to run on any operating system that includes the runtime environment. Similarly, operating system 1730 can support containers, and applications 1732 can be in the form of containers, which are lightweight, standalone, executable packages of software that include, e.g., code, runtime, system tools, system libraries and settings for an application.

Further, computer 1702 can comprise a security module, such as a trusted processing module (TPM). For instance, with a TPM, boot components hash next in time boot components, and wait for a match of results to secured values, before loading a next boot component. This process can take place at any layer in the code execution stack of computer 1702, e.g., applied at the application execution level or at the operating system (OS) kernel level, thereby enabling security at any level of code execution.

A user can enter commands and information into the computer 1702 through one or more wired/wireless input devices, e.g., a keyboard 1738, a touch screen 1740, and a pointing device, such as a mouse 1742. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1704 through an input device interface 1744 that can be coupled to the system bus 1708, but can be connected by other interfaces, such as a parallel port, an IEEE 1394 serial port, a game port, a USB port, an IR interface, a BLUETOOTH® interface, etc.

A monitor 1746 or other type of display device can be also connected to the system bus 1708 via an interface, such as a video adapter 1748. In addition to the monitor 1746, a computer typically includes other peripheral output devices (not shown), such as speakers, printers, etc.

The computer 1702 can operate in a networked environment using logical connections via wired and/or wireless communications to one or more remote computers, such as a remote computer(s) 1750. The remote computer(s) 1750 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1752 is illustrated. The logical connections depicted include wired/wireless connectivity to a local area network (LAN) 1754 and/or larger networks, e.g., a wide area network (WAN) 1756. Such LAN and WAN networking environments are commonplace in offices and companies, and facilitate enterprise-wide computer networks, such as intranets, all of which can connect to a global communications network, e.g., the internet.

When used in a LAN networking environment, the computer 1702 can be connected to the local network 1754 through a wired and/or wireless communication network interface or adapter 1758. The adapter 1758 can facilitate wired or wireless communication to the LAN 1754, which can also include a wireless access point (AP) disposed thereon for communicating with the adapter 1758 in a wireless mode.

When used in a WAN networking environment, the computer 1702 can include a modem 1760 or can be connected to a communications server on the WAN 1756 via other means for establishing communications over the WAN 1756, such as by way of the internet. The modem 1760, which can be internal or external and a wired or wireless device, can be connected to the system bus 1708 via the input device interface 1744. In a networked environment, program modules depicted relative to the computer 1702 or portions thereof, can be stored in the remote memory/storage device 1752. It will be appreciated that the network connections shown are example and other means of establishing a communications link between the computers can be used.

When used in either a LAN or WAN networking environment, the computer 1702 can access cloud storage systems or other network-based storage systems in addition to, or in place of, external storage devices 1716 as described above. Generally, a connection between the computer 1702 and a cloud storage system can be established over a LAN 1754 or WAN 1756 e.g., by the adapter 1758 or modem 1760, respectively. Upon connecting the computer 1702 to an associated cloud storage system, the external storage interface 1726 can, with the aid of the adapter 1758 and/or modem 1760, manage storage provided by the cloud storage system as it would other types of external storage. For instance, the external storage interface 1726 can be configured to provide access to cloud storage sources as if those sources were physically connected to the computer 1702.

The computer 1702 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 18:
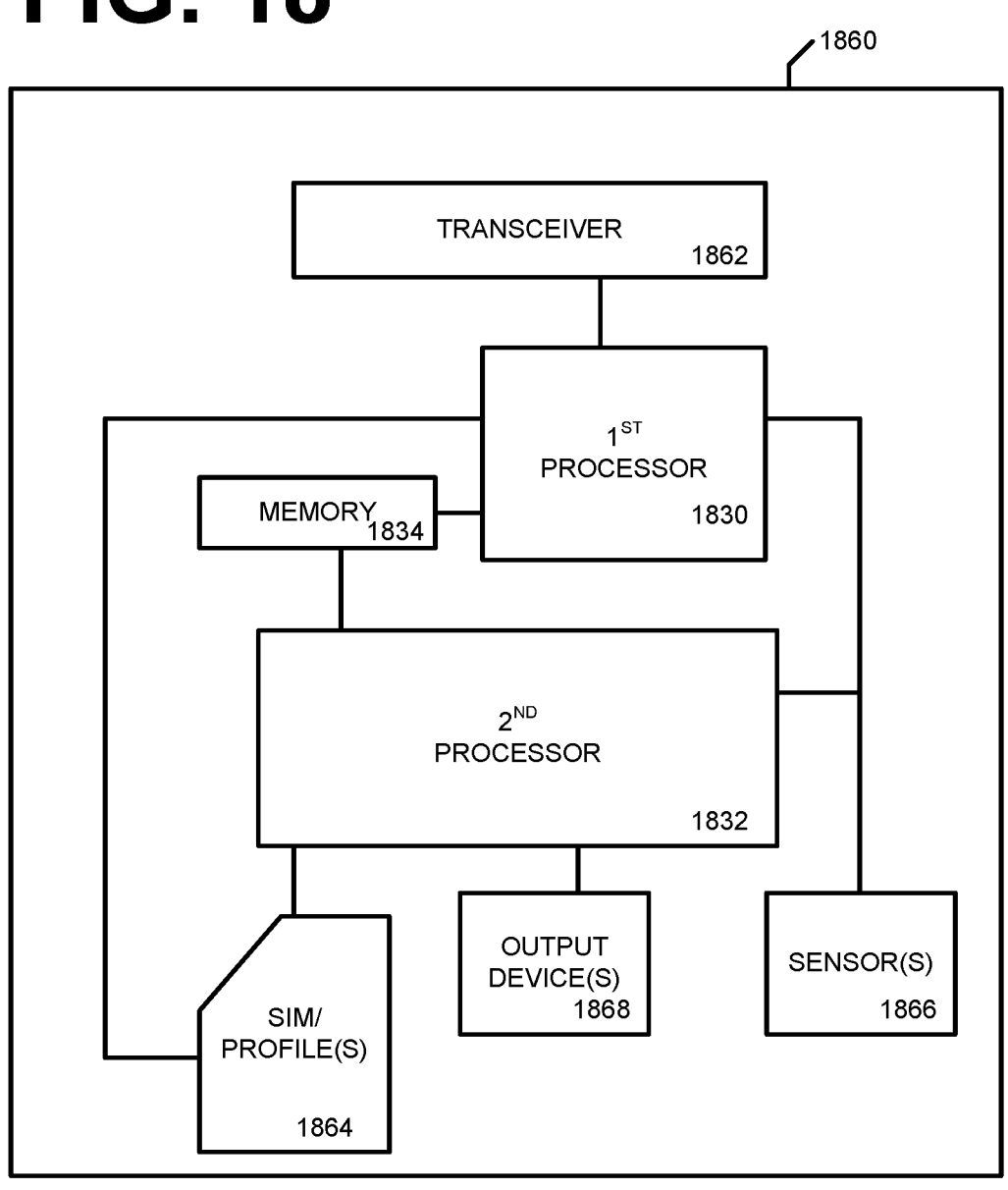
FIG. 18 illustrates a block diagram of an example wireless UE.

Turning to FIG. 18, the figure illustrates a block diagram of an example UE 1860. UE 1860 may comprise a smart phone, a wireless tablet, a laptop computer with wireless capability, a wearable device, a machine device that may facilitate vehicle telematics, a tracking device, remote sensing devices, and the like. UE 1860 comprises a first processor 1830, a second processor 1832, and a shared memory 1834. UE 1860 includes radio front end circuitry 1862, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1862 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 18, UE 1860 may also include a SIM 1864, or a SIM profile, which may comprise information stored in a memory (memory 1834 or a separate memory portion), for facilitating wireless communication with RAN 105 or core network 130 shown in FIG. 1. FIG. 18 shows SIM 1864 as a single component in the shape of a conventional SIM card, but it will be appreciated that SIM 1864 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1864 and another device, which may be a component of RAN 105 or core network 130 shown in FIG. 1). A SIM profile 1864 may also comprise identifying information that is unique to the SIM, or SIM profile, such as, for example, an International Mobile Subscriber Identity ("IMSI") or information that may make up an IMSI.

SIM 1864 is shown coupled to both the first processor portion 1830 and the second processor portion 1832. Such an implementation may provide an advantage that first processor portion 1830 may not need to request or receive information or data from SIM 1864 that second processor 1832 may request, thus eliminating the use of the first processor acting as a 'go-between' when the second processor uses information from the SIM in performing its functions and in executing applications. First processor 1830, which may be a modem processor or a baseband processor, is shown smaller than processor 1832, which may be a more sophisticated application processor, to visually indicate the relative levels of sophistication (i.e., processing capability and performance) and corresponding relative levels of operating power consumption levels between the two processor portions. Keeping the second processor portion 1832 asleep/inactive/in a low power state when UE 1860 does not need it for executing applications and processing data related to an application provides an advantage of reducing power consumption when the UE only needs to use the first processor portion 1830 while in listening mode for monitoring routine configured bearer management and mobility management/maintenance procedures, or for monitoring search spaces that the UE has been configured to monitor while the second processor portion remains inactive/asleep.

UE 1860 may also include sensors 1866, such as, for example, temperature sensors, accelerometers, gyroscopes, barometers, moisture sensors, and the like that may provide signals to the first processor 1830 or second processor 1832. Output devices 1868 may comprise, for example, one or more visual displays (e.g., computer monitors, VR appliances, and the like), acoustic transducers, such as speakers or microphones, vibration components, and the like. Output devices 1868 may comprise software that interfaces with output devices, for example, visual displays, speakers, microphones, touch sensation devices, smell or taste devices, and the like, that are external to UE 1860.

The following glossary of terms given in Table 1 may apply to one or more descriptions of embodiments disclosed herein.

TABLE 1

| Term | Definition |
| --- | --- |
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |

TABLE 1-continued

| Term | Definition |
| --- | --- |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a user equipment comprising a processor from a first radio access network node, a network energy saving handover configuration comprising a beam-specific first resource indication indicative of a first resource, corresponding to a serving beam configured to serve the user equipment, wherein the user equipment uses the network energy saving handover configuration to receive beam-specific network energy saving handover configuration indications; and performing, by the user equipment, at least one network energy saving handover operation according to the beam-specific network energy saving handover configuration.

2. The method of claim 1, wherein the network energy saving handover configuration further comprises a beam-specific handover coverage criterion usable by user equipment to determine to monitor the first resource, wherein the at least one network energy saving handover operation comprises;

determining a signal strength corresponding to the serving beam to result in a determined serving beam signal strength;

analyzing the determined serving beam signal strength with respect to the beam-specific handover coverage criterion to result in an analyzed serving beam signal strength;

based on the analyzed serving beam signal strength satisfying the beam-specific handover coverage criterion, receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information;

receiving, by the user equipment according to the second resource, a network energy saving handover information message comprising handover information; and transmitting, to a second radio access network node according to the handover information, a handover request.

3. The method of claim 2, further comprising:

transmitting, by the user equipment to the first radio access network node, a handover success message indicative to the first radio access network node that the user equipment has successfully been handed over to the second radio access network node.

4. The method of claim 1, wherein the network energy saving handover configuration further comprises a beam-specific handover coverage criterion usable by the user equipment to determine to monitor the first resource, wherein the at least one network energy saving handover operation comprises;

determining a signal strength corresponding to the serving beam to result in a determined serving beam signal strength;

analyzing the determined serving beam signal strength with respect to the beam-specific handover coverage criterion to result in an analyzed serving beam signal strength;

based on the analyzed serving beam signal strength failing to satisfy the beam-specific handover coverage criterion, avoiding, by the user equipment, monitoring the first resource; and communicating traffic with the first radio access network node.

5. The method of claim 1, wherein the network energy saving handover configuration further comprises a user equipment identifier corresponding to the user equipment, further comprising:

based on correspondence of the user equipment identifier to the user equipment, receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information;

receiving, by the user equipment according to the second resource, a network energy saving handover information message comprising handover information; and transmitting, to a second radio access network node according to the handover information, a handover request.

6. The method of claim 5, wherein the user equipment identifier comprises a mask identifier, wherein the network energy saving handover configuration is specifically corresponds only to the user equipment, and wherein the network energy saving handover configuration further comprises the mask identifier being associated with a unique identifier corresponding to the user equipment.

7. The method of claim 6, wherein the unique identifier corresponding to the user equipment is an international mobile subscriber identity.

8. The method of claim 5, wherein the handover information comprises a radio access network node identifier corresponding to the second radio access network node.

9. The method of claim 1, wherein the at least one network energy saving handover operation comprises:

receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information;

receiving, by the user equipment according to the second resource, a network energy saving handover information message comprising handover information, wherein the handover information comprises a first radio access network node identifier corresponding to a second radio access network node and a second radio access network node identifier corresponding to a third radio access network node;

determining, by the user equipment, a first signal strength with respect to the second radio access network node and a second signal strength with respect to the third radio access network node;

based on the first signal strength and the second signal strength, determining, by the user equipment, a strongest signal strength;

determining, by the user equipment, the second radio access network node or the third radio access network node corresponding to the strongest signal strength to result in a determined strongest radio access network node; and transmitting, by the user equipment to the determined strongest radio access network node, a handover request.

10. The method of claim 9, wherein the handover information comprises a first preamble associated with the first radio access network node identifier and a second preamble associated with the second radio access network node identifier, and wherein the handover request comprises the first preamble or the second preamble associated with the determined strongest radio access network node.

11. A user equipment, comprising:

a processor configured to:

receive, from a serving radio access network node, a network energy saving handover configuration comprising a beam-specific first resource indication indicative of a first resource, corresponding to a serving beam configured to serve a set of user equipment comprising the user equipment and usable by the set of user equipment to receive beam-specific network energy saving handover configuration indications, and a beam-specific handover coverage criterion usable by the set of user equipment to determine to monitor the first resource;

determine a signal strength corresponding to the serving beam to result in a determined serving beam signal strength;

analyze the determined serving beam signal strength with respect to the beam-specific handover coverage criterion to result in an analyzed serving beam signal strength;

based on the analyzed serving beam signal strength satisfying the beam-specific handover coverage criterion, receiving, by the user equipment, a network energy saving handover configuration indication, via the first resource, comprising a beam-specific second resource indication indicative of a second resource, corresponding to the serving beam, usable by user equipment to receive network energy saving handover information messages comprising handover information;

receive, by the user equipment according to the second resource, a network energy saving handover information message comprising handover information; and transmit, to a target radio access network node according to the handover information, a handover request.

12. The user equipment of claim 11, wherein the processor is further configured to transmit, to the serving radio access network node, a handover success message indicative to the serving radio access network node that the user equipment has successfully been handed over the target radio access network node.

13. The user equipment of claim 11, wherein the handover information comprises target radio access network node identifying information corresponding to the target radio access network node.

14. The user equipment of claim 11, wherein the user equipment is a first user equipment, wherein the set of user equipment further comprises a second user equipment, wherein the handover information comprises a first user equipment identifier corresponding to the first user equipment and a second user equipment identifier corresponding to the second user equipment, wherein the first user equipment identifier and the second user equipment identifier are respectively indicative to the first user equipment and the second user equipment that the first user equipment and the second user equipment are specified to be handed over to the target radio access network node, wherein the handover request is a first handover request with respect to the first user equipment and the handover request is a second handover request with respect to the second user equipment, and wherein the first user equipment transmits the first handover request to the target radio access network node and the second user equipment transmits the second handover request to the target radio access network node.

15. The user equipment of claim 11, wherein the first resource indicated in the network energy saving handover configuration is usable by multiple user equipment to receive beam-specific network energy saving handover configuration indications.

16. A non-transitory machine-readable medium, comprising executable instructions that, when executed by a processor of a user equipment, facilitate performance of operations, comprising:

receiving, from a source radio access network node, a network energy saving handover configuration comprising a beam-specific first resource indication indicative of a first resource, corresponding to a serving beam configured to serve the user equipment, usable, by a group of user equipment that comprises the user equipment, to receive beam-specific network energy saving handover configuration indications, wherein the network energy saving handover configuration further comprises a user equipment identifier corresponding to the user equipment;

based on correspondence of the user equipment identifier to the user equipment, receiving a network energy saving handover configuration indication, via the first resource, comprising a beam-specific second resource indication indicative of a second resource, corresponding to the serving beam, usable by user equipment of the group of user equipment, to receive network energy saving handover information messages comprising handover information;

receiving, by the user equipment according to the second resource, a network energy saving handover information message comprising handover information; and transmitting, to a target radio access network node according to the handover information, a handover request.

17. The non-transitory machine-readable medium of claim 16, wherein the handover information comprises a first radio access network node identifier corresponding to a first potential target radio access network node and a second radio access network node corresponding to a second potential target radio access network node, the operations further comprising;

determining a first signal strength with respect to the first potential target radio access network node and a second signal strength with respect to the second potential target radio access network node;

based on the first signal strength and the second signal strength, determining a strongest signal strength; and determining the first potential target radio access network node or the second potential target radio access network node corresponding to the strongest signal strength to result in the target radio access network node.

18. The non-transitory machine-readable medium of claim 17, wherein the network energy saving handover configuration comprises a first preamble corresponding to the first potential target radio access network node and a second preamble corresponding to the second potential target radio access network node, and wherein the handover request comprises the first preamble or the second preamble corresponding to the target radio access network node.

19. The non-transitory machine-readable medium of claim 16, wherein the first resource comprises a control channel resource and wherein the second resource comprises a data channel resource.

20. The non-transitory machine-readable medium of claim 16, wherein the user equipment identifier is a mask identifier associated, in the network energy saving handover configuration, with an international mobile subscriber identity, and wherein the handover request comprises the international mobile subscriber identity.

\* \* \* \* \*